(12) United States Patent
Nelson et al.

(10) Patent No.: US 12,148,536 B2
(45) Date of Patent: Nov. 19, 2024

(54) SYNCHRONOUS EXCITATION OF MULTIPLE SHOCK WAVES

(71) Applicants: Massachusetts Institute of Technology, Cambridge, MA (US); Centre National De La Recherche Scientifique, Paris (FR)

(72) Inventors: Keith Nelson, Newton, MA (US); Steven Kooi, Lexington, MA (US); Thomas Pezeril, Le Mans (FR)

(73) Assignees: MASSACHUSETTS INSTITUTE OF TECHNOLOGY, Cambridge, MA (US); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 455 days.

(21) Appl. No.: 17/066,909

(22) Filed: Oct. 9, 2020

(65) Prior Publication Data

US 2021/0110937 A1    Apr. 15, 2021

Related U.S. Application Data

(60) Provisional application No. 62/913,940, filed on Oct. 11, 2019.

(51) Int. Cl.
*G21B 1/23*    (2006.01)
*G21B 1/03*    (2006.01)
*G21B 1/19*    (2006.01)

(52) U.S. Cl.
CPC ............... *G21B 1/23* (2013.01); *G21B 1/03* (2013.01); *G21B 1/19* (2013.01)

(58) Field of Classification Search
CPC ..... G21B 1/03; G21B 1/19; G21B 1/23; G02B 27/0905; H01S 3/0057; H01S 5/0057
See application file for complete search history.

(56) References Cited

U.S. PATENT DOCUMENTS 4,061,985 A * 12/1977 Siebert ................. G02F 1/3511
                                                                359/264
6,231,566 B1    5/2001 Lai
(Continued)

FOREIGN PATENT DOCUMENTS

WO    WO 1991/013531    9/1991
WO    WO 1996/036969    11/1996
WO    WO 2003/034441    4/2003

OTHER PUBLICATIONS

Pezeril, Thomas, et al. "Direct visualization of laser-driven focusing shock waves." Physical review letters 106.21 (2011): 214503. ( Year: 2011).*

(Continued)

*Primary Examiner* — Sharon M Davis
(74) *Attorney, Agent, or Firm* — DALY, CROWLEY, MOFFORD & DURKEE, LLP

(57) ABSTRACT

In some embodiments, a method to excite a shock wave in a target assembly includes: splitting a pulsed laser beam into a plurality of pulsed laser beams; spatially shaping the plurality of pulsed laser beams into a plurality of concentric pulsed laser rings of different diameters; and adjusting temporal and/or spatial intervals between the concentric pulsed laser rings to substantially match propagation times of a ring-shaped laser-driven shock wave from one ring to the next in a shock propagation layer of the target assembly.

11 Claims, 17 Drawing Sheets

(56) References Cited

U.S. PATENT DOCUMENTS

| | | | |
|---|---|---|---|
| 2006/0016790 A1 | 1/2006 | Yeik | |
| 2006/0027021 A1* | 2/2006 | Choi | G01N 29/11 |
| | | | 73/579 |
| 2007/0002996 A1* | 1/2007 | Neifeld | G21B 3/00 |
| | | | 376/100 |
| 2008/0063132 A1 | 3/2008 | Birnbach | |
| 2012/0014491 A1 | 1/2012 | Deeth | |

OTHER PUBLICATIONS

PCT International Search Report and Written Opinion dated Feb. 17, 2021 for International Application No. PCT/US2020/054914; 11 pages.

Lee, et al., "High Strain Rate Deformation of Layered Nanocomposites;" Nature Communications; Nov. 6, 2012; 9 Pages.

Pape, et al., "Fusion Energy Output Greater than the Kinetic Energy of an Imploding Shell at the National Ignition Facility;" Physical Review Letters, vol. 120; Jun. 14, 2018; 6 Pages.

Pezeril, et al., "Direct Visualization of Laser-Driven Focusing Shock Waves;" Physical Review Letters, vol. 106; May 24, 2011; 4 Pages.

Veysset, et al., "Acoustical Breakdown of Materials by Focusing of Laser-Generated Rayleigh Surface Waves;" Applied Physics Letters, vol. 111; Jul. 17, 2017; 5 Pages.

Veysset, et al., "Glass Fracture by Focusing of Laser-Generated Nanosecond Surface Acoustic Waves;" Scripta Materialia, vol. 158; Aug. 29, 2018; 4 Pages.

Veysset, et al., "Interferometric Analysis of Laser-Driven Cylindrically Focusing Shock Waves in a Think Liquid Layer;" Scientific Reports, vol. 6, No. 24; Dec. 23, 2016; 7 Pages.

Veysset, et al., "Laser-Induced Versus Shock Wave Induced Transformation of Highly Ordered Pyrolytic Graphite;" Applied Physics Letters, vol. 106; Apr. 21, 2015; 5 Pages.

Veysset, et al., "Single-Bubble and Multibubble Cavitation in Water Triggered by Laser-Driven Focusing Shock Waves;" Physical Review E, vol. 97; May 31, 2018; 8 Pages.

Wu, et al., Ultrafast Laser-Scanning Time-Stretch Imaging at Visible Wavelengths; Light: Science & Applications (2017) vol. 6; Official Journal of the CIOMP; Aug. 12, 2006; 10 Pages.

* cited by examiner a)

b)

SYNCHRONOUS EXCITATION OF MULTIPLE SHOCK WAVES

CROSS-REFERENCE TO RELATED APPLICATIONS

This application claims the benefit under 35 U.S.C. § 119 of provisional patent application No. 62/913,940 filed on Oct. 11, 2019, which is hereby incorporated by reference herein in its entirety.

STATEMENT REGARDING FEDERALLY SPONSORED RESEARCH

This invention was made with government support under W911NF-18-2-0048 awarded by the U.S. Army Research Office. The government has certain rights in the invention.

BACKGROUND

As is known in the art, hundreds of billions of dollars have been spent on research and development of fusion ignition, a potential source of clean energy. Existing fusion ignition research has generally focused on two approaches: using lasers or using magnetic confinement. Existing research into laser-based fusion initiation has focused on the design and construction of lasers that produce megajoule pulse energy. While experiments have shown that the fusion process can be achieved with a fusion energy output twice the peak kinetic energy of the imploding shell, as of now, the energy needed to power such a laser facility is much larger than the fusion energy output. Likewise, research into magnetic confinement-based fusion has so far failed to achieve useful net energy gain. Presently, there remains uncertainty about whether these approaches will be practical for achieving fusion-based clean energy.

SUMMARY

Described herein are systems and techniques to use laser light to efficiently excite a shock wave in a target assembly that includes a fusion sample, allowing it to reach the pressure and temperature conditions required for thermonuclear fusion. A high-energy laser pulse can be split into multiple beams, spatially shaped into a set of concentric rings of different diameters, with the time intervals or radial distances between pulses in different rings and the spatial separations between different rings (i.e. the ring diameters) controlled to match, or substantially match, the propagation times of the laser-driven shock wave from one ring to the next. This is done in order to fulfill the velocity (or phase) matching conditions for coherent excitation and build-up of a primary shock wave travelling toward the center of the rings where focusing takes place.

Disclosed embodiments allow efficient laser excitation of a velocity-matched shock to obtain a primary shock wave that focuses in the plane of a shock propagation layer. The resulting 2D shock focusing may yield the extreme pressures and temperatures required for thermonuclear fusion. In contrast to laser-based fusion experiments in which multiple laser beams are focused on the opaque surface of a target sphere in order to launch a shock wave that focuses in three dimensions (3D) at the center of the sphere, the multiple-pulse techniques described herein have the advantage that the shock propagation layer in which the shock propagates is optically accessible and can be exposed to further shock excitation with multiple laser beams. In the techniques described herein, most of the incident laser light can be absorbed by the shock propagation layer, thereby contributing effectively to the buildup of the shock wave. In conventional laser fusion, much of the laser light is reflected by a plasma that is generated during the early part of the pulsed irradiation. The multi-shock techniques described herein can circumvent the problems of reduced shock generation efficiency due to strong light-induced reflectivity.

The structures and techniques disclosed herein can be used for generation of high shock pressure for material characterization, synthesis, and other applications in addition to fusion. In such embodiments, for fusion and other applications, it may be desirable to control the spatial and/or temporal separations between laser-generated lines or rings such that timed sequences of two or more shocks, rather than a single shock, are generated with control over their relative timing and amplitudes.

According to one aspect of the present disclosure, a method to excite a shock wave in a target assembly includes: splitting a pulsed laser beam into a plurality of pulsed laser beams; spatially shaping the plurality of pulsed laser beams into a plurality of concentric pulsed laser rings of different diameters; and adjusting temporal and/or spatial intervals between the concentric pulsed laser rings to substantially match propagation times of a ring-shaped laser-driven shock wave from one ring to the next in a shock propagation layer of the target assembly.

According to another aspect of the present disclosure, a method to excite shock waves in a sample in a target assembly includes: splitting a pulsed laser beam into a plurality of pulsed laser beams; spatially shaping the plurality of pulsed laser beams into parallel pulsed laser lines; and adjusting the temporal and/or spatial intervals between the parallel pulsed laser lines to substantially match propagation times of a line-shaped laser-driven shock wave from one line to the next in a shock propagation layer of the target assembly.

In some embodiments, spatially shaping the plurality of pulsed laser beams into a plurality of concentric pulsed laser rings and/or parallel pulsed laser lines comprises spatially shaping the plurality of pulsed laser beams using one or more optical phase masks. In some embodiments, adjusting the temporal and/or spatial intervals between the concentric pulsed laser rings and/or parallel pulsed laser lines comprises using a free-space angular-chirp-enhanced delay (FACED) device. In some embodiments, the FACED device comprises an axisymmetric FACED cavity. In some embodiments, the spatial intervals between the pulsed concentric laser rings and/or parallel pulsed laser lines are adjusted using one or more deformable mirrors or spatial light modulators. In some embodiments, the spatial and/or temporal intervals between the pulsed concentric laser rings and/or parallel pulsed laser lines are adjusted by inserting elements of specified thickness and refractive index into the beam paths. In some embodiments, the spatial and/or temporal intervals between the pulsed concentric laser rings and/or parallel pulsed laser lines are adjusted to produce two or more converging shock waves whose relative timing and amplitudes is controlled.

In some embodiments, the ring-shaped shock wave and/or line-shaped laser-driven shock wave propagates substantially within a plane of the shock propagation layer and converges toward a focal region of the target assembly where a fusion sample is positioned. In some embodiments, one or both of the methods includes, coincident or near-coincident with the convergence of the substantially in-plane ring-shaped shock wave and/or line-shaped laser-driven shock wave at the focal region, directing one or more substantially through-plane shock waves at the focal region. In some embodiments, the shock propagation layer is disposed between a first substrate and a second substrate. In some embodiments, the shock propagation layer comprises a liquid or a polymer material that absorbs laser light for effective shock generation. In some embodiments, the shock propagation layer includes a constituent whose absorption spectrum shifts under pressure such that its absorption of the laser light is stronger while the shock is present. In some embodiments, the ring-shaped shock wave and/or shaped laser-driven shock wave converges toward a focal region of the target assembly where a fusion sample is positioned. In some embodiments, the fusion sample includes at least one of: a liquid film of Deuterium-Tritium; a solid film Deuterium-Tritium; a liquid film of heavy water (D2O) with a trapped Deuterium-Tritium bubble; or a frozen film of heavy water with a trapped Deuterium-Tritium bubble. In any of these example, Deuterium-Tritium can be replaced with Deuterium-only constituents.

According to another aspect of the present disclosure, a system includes: a target assembly having a shock propagation layer; one or more laser sources to generate a pulsed laser beam; and an optical device. The optical device includes: a spatio-temporal splitting system to split the pulsed laser beam into a plurality of laser beam shapes, the laser beam shapes comprising a plurality of pulsed laser rings of different diameters or a plurality of pulsed parallel pulsed laser lines; and one or more shaping elements to shape the plurality of pulsed laser beams into the plurality of pulsed laser rings of different diameters or the plurality of pulsed parallel pulsed laser lines. The optical device is configured to adjust temporal and/or spatial intervals between the laser beam shapes to substantially match propagation times of a shaped laser-driven shock wave from one shape to the next in the shock propagation layer.

In some embodiments, the shock propagation layer is disposed between a first substrate and a second substrate. In some embodiments, the shock propagation layer comprises a liquid or a polymer material that absorbs laser light for effective shock generation. In some embodiments, the shock propagation layer includes a constituent whose absorption spectrum shifts under pressure such that its absorption of the laser light is stronger while the shock is present. In some embodiments, the system can include a fusion sample located at a focal region of the target assembly where the shaped shock wave converges toward. In some embodiments, the fusion sample comprising at least one of: a liquid film of Deuterium-Tritium; a solid film Deuterium-Tritium; a liquid film of heavy water (D2O) with a trapped Deuterium-Tritium bubble; or a frozen film of heavy water with a trapped Deuterium-Tritium bubble. In any of these example, Deuterium-Tritium can be replaced with Deuterium-only constituents.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Disclosed herein are systems, structures, and techniques to efficiently excite a strong shock wave in a target assembly, allowing a fusion sample to reach the pressure and temperature conditions required for thermonuclear fusion.

Figure 1:
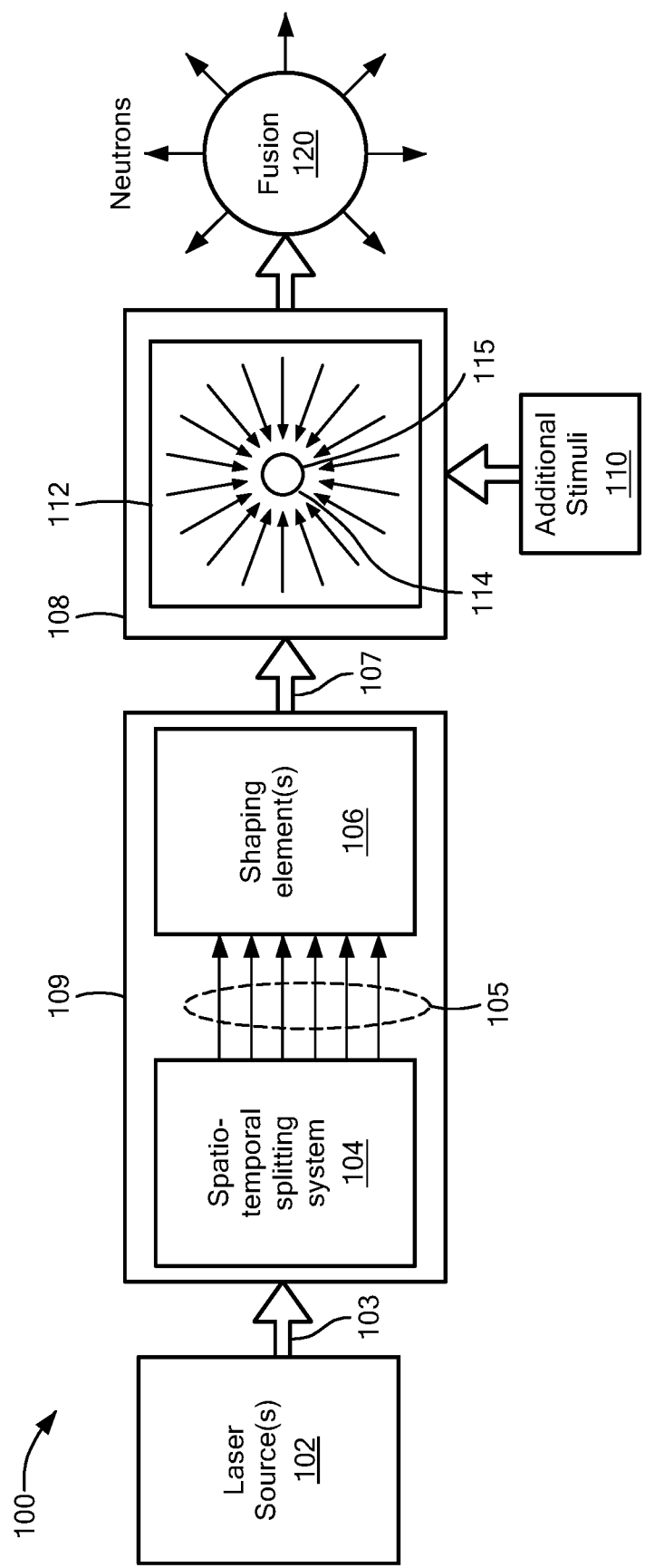
FIG. 1 is a block diagram of a system for fusion ignition, according to some embodiments of the present disclosure.

Referring to FIG. 1, according to some embodiments, a system 100 for fusion ignition can include one or more laser sources 102, an optical device for shock velocity-matching 109, and a target assembly 108. The optical device 109 includes a spatio-temporal splitting system 104 and one or more shaping elements 106. The target assembly 108 includes a shock propagation layer 112 and a focal region 114 within the propagation layer 112 where shock is focused on a fusion sample 115. Laser source(s) 102 can generate high-energy laser beam(s) or pulse(s) 103 that can be split into multiple beams 105 via spatio-temporal splitting system 104. As used herein, the phrase "high-energy laser beam" refers to a laser beam with a pulse that has an energy level of at least 1 Joule. In some embodiments, a high-energy laser can have an energy level of at least 100 Joules. In some embodiments, laser source(s) 102 can be provided as energy-efficient pulsed lasers, such as Nd:YAG (neodymium-doped yttrium aluminum garnet) lasers. Shaping elements 106, operating in conjunction with spatio-temporal splitting system 104, can shape the multiple beams 105 to cause a velocity-matched shock wave 107 to be optically excited at specifically chosen locations and at controlled delay times. The shock wave 107 can be controlled so as to propagate through the propagation layer 112 and converge (in two-dimensions or three-dimensions) on a fusion sample 115 located within the focal region 114 to produce fusion 120.

The energy released during the fusion process can be collected via the emission of high-energy neutrons and other high-energy particles escaping from the fusion sample 115 at the center of the laser rings. For example, target assembly 108 can be positioned within a chamber that serves as a heat exchanger, meaning the chamber walls can trap high-energy neutrons and other high-energy particles for conversion of the nuclear energy into heat.

In some embodiments, shaping elements 106 can include an optical phase mask (or multiple masks) to convert an array of beams 105, which might be an array of spatially separated parallel lines, into concentric rings, as described further below in the context of FIG. 2A. In some embodiments, shaping elements 106 can shape the beams 105 into a set of parallel lines, as described below in the context of FIG. 3A, and may include a focusing element placed along the pathway of a line-shaped shock wave to focus the shock energy on the focal region 114.

In some embodiments, shock propagation layer 112 can be provided as a liquid, polymer, or other material type that absorbs a significant fraction of the laser light. In some embodiments, the shock propagation layer includes a constituent whose absorption spectrum shifts under pressure such that its absorption of the laser light is stronger while the shock is present. In some embodiments, the shock propagation layer is disposed between a first substrate and a second substrate. Further discussion of the makeup of a shock propagation layer that can be used within a disclosed fusion ignition system is provided below.

In some embodiments, system 100 can further include additional stimuli 110, such as a through-plane laser-driven shock, laser pulses to optically excite the fusion sample and/or to induce cavitation at or around the fusion sample, or an AC acoustic field acting on a cavitation bubble at the fusion sample, to cause shock waves 107 to be further excited.

In some embodiments, shock propagation layer 112 can have a thickness of less than 1 mm or less than 0.1 mm. In such embodiments, the primary shock propagation can be within the plane of the shock propagation layer 112 and can converge toward the focal region 114. In some embodiments, fusion sample 115 can be pre-positioned within focal region 114 of target assembly 108. Examples of target assemblies that can be used within system 100 are described below in the context of FIGS. 4A and 4B.

In some embodiments, target assembly 108 can be sealed to reflect the multiple shock waves travelling outward the focal region 114 as well as to confine laser-excited plasma or gases that will further compress, as a piston, the fusion sample 115.

Within system 100, the spatio-temporal control of the laser excitation of phase-matched shock waves can be achieved using a variety of optical designs. For example, system 100 can include the free-space angular-chirp-enhanced delay (FACED) device described in J.-L. Wu et al., Light: Science & Applications 6, 16196 (2017), which publication is hereby incorporated by reference in its entirety. Such an optical device can use multiple reflections between two non-parallel reflectors to produce an optical array of stripes or lines in the focal plane of a lens, with a controllable and well-defined inter-line spacing and with a controllable incremental delay time between successive stripes or lines. A deformable mirror or spatial light modulator (SLM) (or more than one deformable mirror or SLM) can then be used to adjust the spacings between the parallel lines as well as the widths of individual lines. An optical phase mask (or multiple masks) can be designed to transform the stripes into concentric rings of different diameters. In some embodiments, the optical phase mask can be a fixed imprinted pattern on a substrate or a reconfigurable SLM to control each of the individual rings (size, shape and intensity distribution). In some embodiments, the programmable deformable mirrors can be used to control each of the individual rings (size, shape and intensity distribution).

In some embodiments, to provide the spatio-temporal control, system 100 can include a conical cavity made of two conical mirrors or one flat mirror and one conical mirror that can directly output concentric rings of different diameters from a single beam input. This axisymmetric FACED cavity, or conical cavity, made using one or two reflective axicons (conical prisms), can incorporate one or several deformable mirrors. Alternatively, the output from the conical cavity can be directed onto one or more deformable mirrors or SLMs to control the spacings between concentric rings, the widths of the lines that define each ring, and the intensity distribution of light at the rings in the target assembly. In some embodiments, to provide the spatio-temporal control, system 100 can incorporate an optical cavity merging a Herriott multipass cavity and an optical device (e.g., a FACED device) that, in conjunction with an axicon and a focusing lens, produce concentric rings of different diameters in the target assembly 108. Use of a multiple optical ring configuration can extend to far higher shock pressures the method for shock focusing (using a single ring of excitation laser light) demonstrated in the following publications, each of which is hereby incorporated by reference in its entirety.

D. Veysset, S. E. Kooi, R. Haferssas, M. Hassani-Gangaraj, M. Islam, A. Maznev, Y. Chernukha, X. Zhao, K. Nakagawa, D. Martynowich, X. Zhang, A. Lomonosov, C. Schuh, R. Radovitzky, T. Pezeril, Keith A. Nelson, Scr. Mater. 158, 42 (2019).

D. Veysset, U. Gutiérez-Hernandez, L. Dresselhaus-Cooper, F. De Colle, S. Kooi, K. A. Nelson, P. A. Quinto-Su, T. Pezeril, Phys. Rev. E 97, 053112 (2018).

D. Veysset, A. Maznev, István A. Veres, T. Pezeril, S. Kooi, Alexey M. Lomonosov, Keith A. Nelson, Appl. Phys. Lett. 111, 031901 (2017).

D. Veysset, A. Maznev, T. Pezeril, S. Kooi, Keith A. Nelson, Scientific Reports 6, 24 (2016).

D. Veysset, T. Pezeril, S. Kooi, A. Bulou, Keith A. Nelson, Appl. Phys. Lett. 106, 161902 (2015).

T. Pezeril, G. Saini, D. Veysset, S. Kooi, P. Fidkowski, R. Radovitzky, Keith A. Nelson, Phys. Rev. Lett. 106, 214503 (2011).

In contrast to the aforementioned publications, embodiments of the present disclosure can use multiple concentric excitation rings instead of just one excitation ring. Shock focusing at the center of the rings, in conjunction with velocity matching to build up the shock wave as it propagates from one ring to the next, may produce very high pressure and temperature conditions at the center of the rings, that may yield measurable amounts of thermonuclear fusion.

In addition to fusion generation, the system of FIG. 1 can be used for the generation of high shock pressure for material characterization, synthesis, and other applications.

Figure 2A:
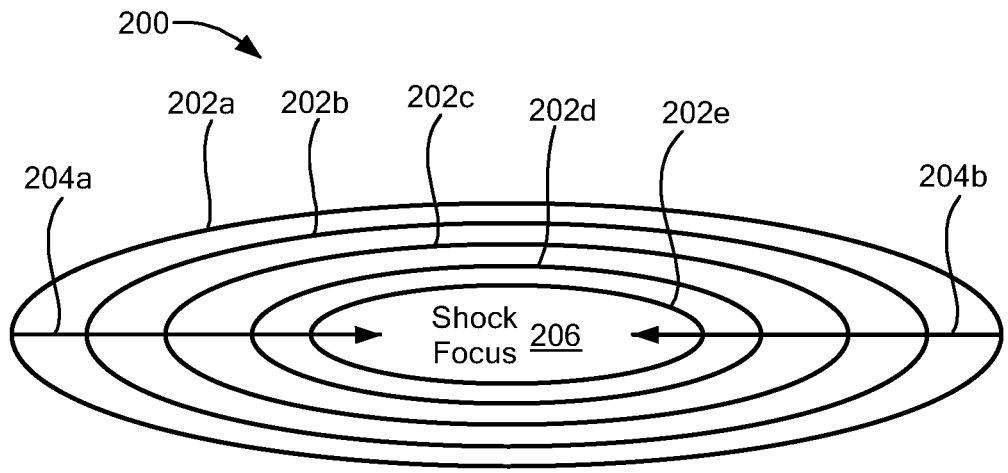
FIG. 2A is a pictorial diagram of a planar multi-shock geometry that can be used within the system of FIG. 1, according to some embodiments of the present disclosure.

FIG. 2A shows an example of a planar multi-shock geometry 200 that can be used, for example, within the fusion ignition system 100 of FIG. 1. In the illustrated embodiment, multiple laser beams may be spatially shaped (e.g., using elements 104 and 106 of FIG. 1) into a set of concentric rings 202a-202e (202, generally) of different controllable diameters. Each of these excitation rings 202 can contribute to a shock wave that travels toward a focal region 206 at center of the rings, as illustrated by arrows 204a and 204b. The time intervals between pulses in different rings and/or the spatial separations between different rings 202 can be controlled or adjusted to match the propagation times of the laser-driven shock wave from one ring to the next. That is, the timing of the pulses in the excitation rings and the diameters of the different rings 202 can be controlled to fulfill the velocity matching condition for coherent excitation and build-up of a primary shock wave travelling toward the focal region 206. (Shocks other than the "primary" shock may also be launched by the pulsed laser light, and will typically be weaker than the primary shock and may propagate in directions or in regions of the target assembly different from the primary shock.) A fusion sample of interest (e.g., fusion sample 115 of FIG. 1) may be positioned near the center of the rings 206 for fusion ignition. While five (5) concentric rings 202a-202e are shown in the example of FIG. 2A, other numbers of rings (e.g., between 6 and 50 rings) can be used.

Figure 2B:
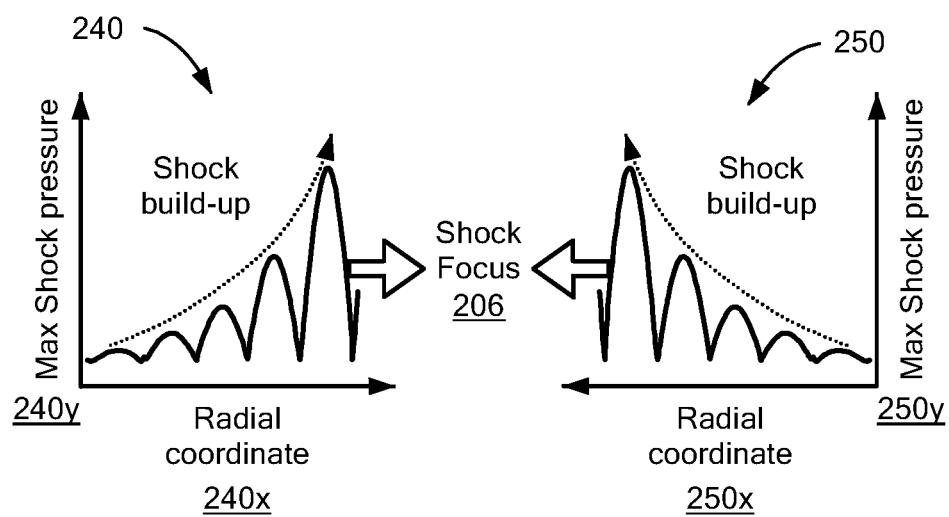
FIG. 2B is a graphical diagram showing an example of shock build-up using the multi-shock geometry of FIG. 2A.

FIG. 2B illustrates how velocity-matching allows a build-up of the shock amplitude as the shock wave propagates toward the center of the rings 206 from opposing directions. A first illustrative (qualitative) plot 240 has a horizontal axis 240x representing a first direction of wave propagation (e.g., direction 204a in FIG. 2A) and a vertical axis 240y representing shock pressure. A second illustrative plot 250 has a horizontal axis 250x representing a second direction of wave propagation (e.g., direction 204b in FIG. 2A) and a vertical axis 250y representing shock pressure.

Since shock waves are nonlinear waves whose speeds increase with pressure, the primary shock wave that builds up during propagation toward the center will increase in speed as it gets closer to the center. Therefore, in order to achieve an efficient build-up of the primary shock wave, either the time delay or the spacing between each excitation ring source has to be tuned in order to match the variation of the shock speed toward the center. In general, this means that the spacing or the time delay between successive rings on the sample surface should not be constant. There are several technical possibilities that could be used to fulfill this requirement. For example, in some embodiments, an optical phase mask used to convert an array of lines, with constant inter-line spacing from an optical device (e.g., a FACED device), into concentric rings can be designed such that it would lead to concentric rings with non-constant inter-ring spacings that would match the variation of the shock speed along the sample surface. As another example, an optical device (e.g. a FACED device followed by a deformable mirror or SLM) can be modified to directly output an array of lines with non-constant inter-line spacings that would match the variation of the shock speed. In some embodiments, this can be achieved by replacing one large reflector in the optical device with multiple small reflectors whose positions and reflection angles can be adjusted, or by a large deformable mirror. As another example, optical elements can be inserted inside or outside an optical device (such as FACED cavity) in order to temporally delay the pulses that pass through them, in order to obtain a non-constant time delay between lines or stripes. One or more of these approaches can be used to control the inter-line spacing and timing as required. In other embodiments, a conical FACED cavity could be used as described above to directly generate concentric rings of light, and the spacings between rings could be controlled by a one or more deformable mirrors or SLMs.

While certain embodiments may be described herein with reference to excitation rings, it should be understood that in each case other excitation geometries are possible.

Figure 3A:
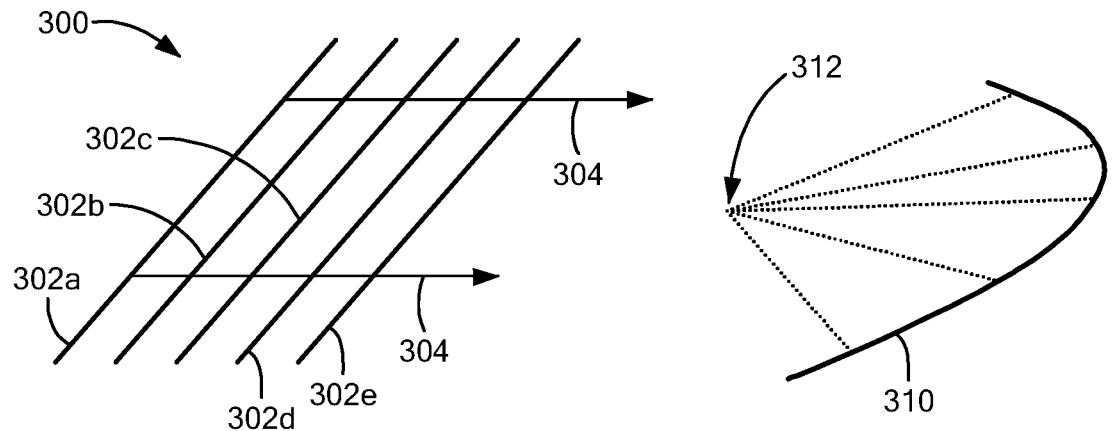
FIG. 3A is a pictorial diagram showing another planar multi-shock geometry that can be used within the system of FIG. 1, according to some embodiments of the present disclosure.

FIG. 3A shows an alternative technique for achieving focusing of the velocity-matched shock that can be utilized, for example, within the fusion ignition system 100 of FIG. 1. In the illustrated planar multi-shock geometry 300, multiple laser beams shaped as parallel lines 302a-302e (302, generally) can arrive at a shock propagation layer with appropriate spatial and temporal intervals to allow velocity matching in order to excite a line-shaped shock wave propagating in the shock propagation layer (e.g., in shock paragraph layer 108 of FIG. 1) as illustrated by arrows 304. In some embodiments, a reflective or transmissive acoustic lens 310 can be placed along the pathway of the line-shaped shock wave to focus the shock energy within a focal region 310 on the sample surface. The acoustic lens 310 can be provided as a curved element incorporated into the shock propagation layer.

Figure 3B:
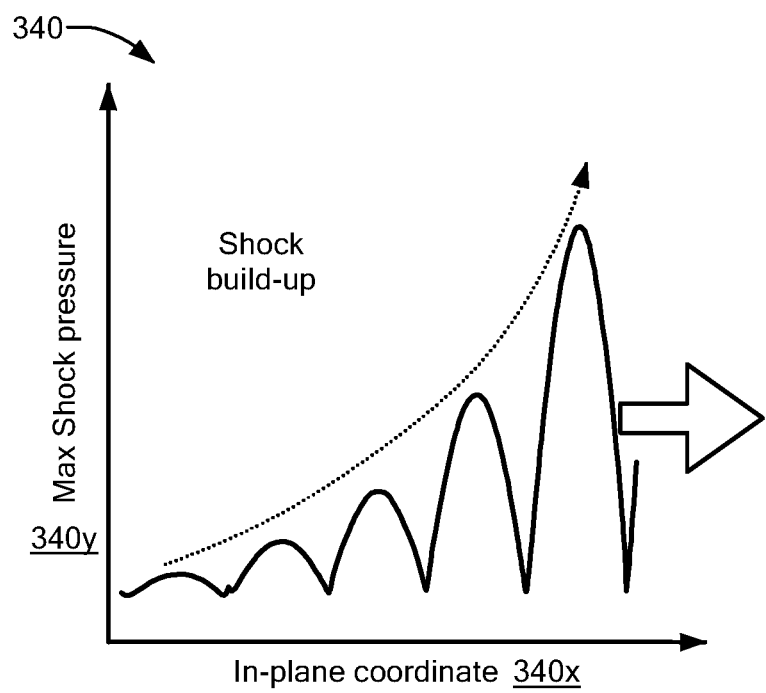
FIG. 3B is a graphical diagram showing an example of shock build-up using the planar multi-shock geometry of FIG. 3A.

FIG. 3B shows shock build-up that may occur using the laser beam configuration of FIG. 3A. An illustrative qualitative plot 340 has a horizontal axis 340x representing the direction of wave propagation (e.g., direction 304 in FIG. 3A) and a vertical axis 340y representing shock pressure.

Figure 4A:
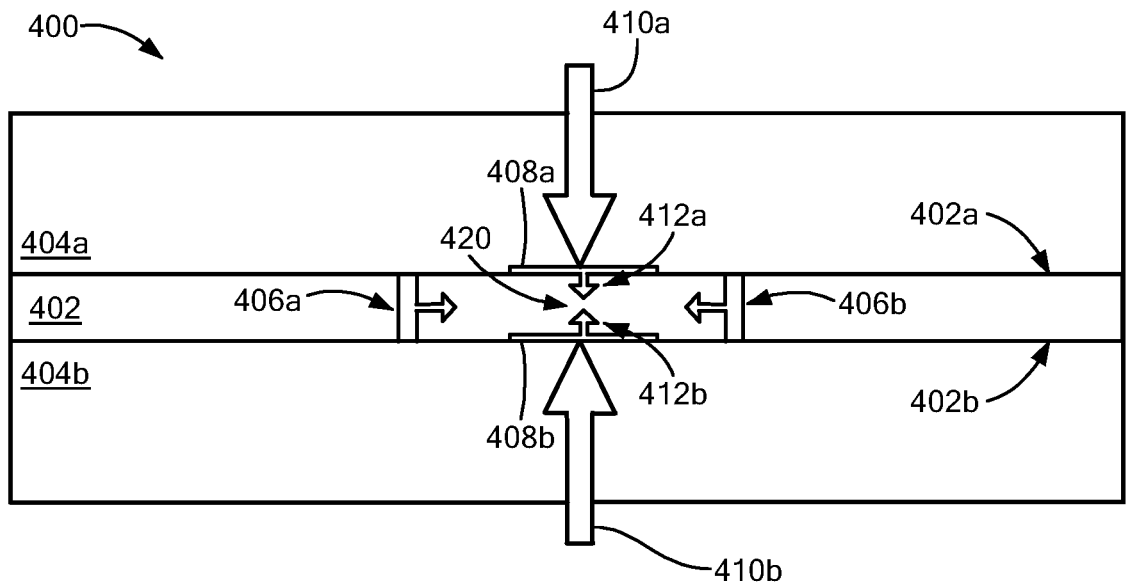
FIG. 4A is a side view diagram of a target assembly that can be used within the system of FIG. 1, according to some embodiments of the present disclosure.

Turning to FIG. 4A, disclosed embodiments allow additional shock excitation, in addition to the multi-shock geometries shown in FIGS. 2A and 3A. An illustrative target assembly 400 can be provided, for example, within the fusion ignition system 100 of FIG. 1. The target assembly 400 includes a shock propagation layer 402 having an upper planar surface 402a and a lower planar surface 402b. An upper substrate layer 404a is disposed over the propagation layer upper surface 402a and a lower substrate layer 404b is disposed below the propagation layer lower surface 402b. In some embodiments, shock propagation layer 402 can be provided as a liquid, polymer, or other material type that absorbs a significant fraction of the laser light. In some embodiments, substrate layers 404a, 404b can be formed from or coated with a hard solid material, such as diamond, boron nitride, sapphire, or other materials that can sustain high pressures and high temperatures and substantially confine the shock wave in the propagation layer.

A fusion sample (not shown) can be pre-positioned in a focal region 420 located, for example, midway along a length of the shock propagation layer 402, as shown. "In-plane" shock waves 406a, 406b can be propagated towards the focal region 420 using, for example, the multi-shock techniques described above in the context of FIGS. 2A and 3A.

Coincident with, or near-coincident with, the arrival of the in-plane shock waves 406a, 406b at the focal region 420, through-plane shock waves 412a, 412b can be generated from above and below the focal region 420 to increase the overall shock pressure. As used herein, the phrase "near-coincident" refers to two events that occur within several nanoseconds of each other (e.g., within less than 10 or less than 100 nanoseconds of each other). In some embodiments, the through-plane shock waves 412a, 412b can be generated by additional stimuli 410a, 410b directed to irradiate absorbing layers or ablators 408a, 408b positioned between the substrate layers 404a, 404b and the shock propagation layer 402 (e.g. fabricated by deposition onto the substrates), as shown. In some embodiments, additional stimuli 410a, 410b may be intense laser pulses up to hundreds of Joules energy (e.g., at least 100 Joules). In some embodiments, additional stimuli 410a, 410b may be light in a frequency range from far-infrared (terahertz frequency range) to x-rays. Thus, using the structures and techniques illustrated in FIG. 4A, a fusion sample can be subjected to both the focusing in-plane shock waves 406a, 406b and the through-plane shock waves 412a, 412b, increasing the total pressure and temperature within focal region 420.

In other embodiments, additional stimuli 410a, 410b from above and below can irradiate the fusion sample itself, or a thin absorbing containment vessel for the fusion sample, rather than absorbing layers 408a, 408b on the substrates 404a, 404b. The fusion sample can be excited this way prior to or approximately coincident with in-plane shock focusing.

Figure 4B:
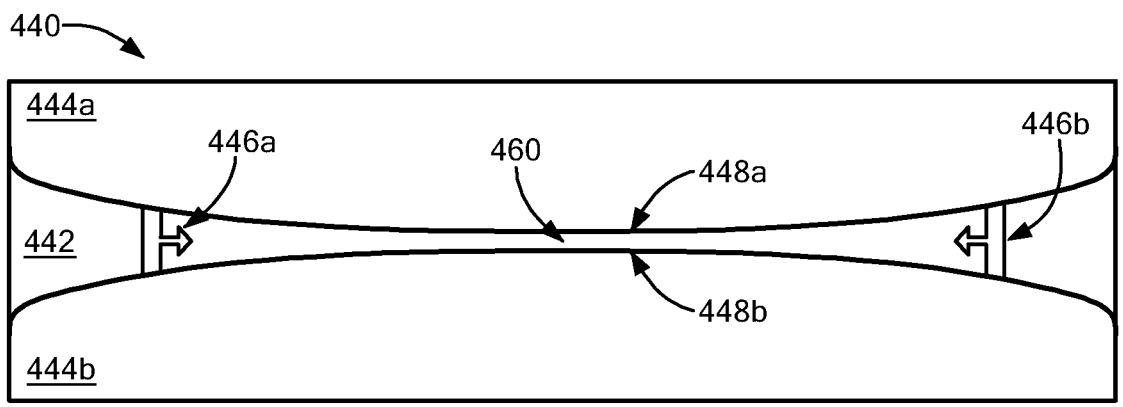
FIG. 4B is a side view diagram of another target assembly that can be used within the system of FIG. 1, according to some embodiments of the present disclosure.

Turning to FIG. 4B, in some embodiments, additional shock strength may be achieved using curved or tapered substrates instead of flat parallel substrates. An illustrative target assembly 440 can be provided, for example, within the fusion ignition system 100 of FIG. 1. The target assembly 440 includes a shock propagation layer 442 disposed between an upper substrate 444a and a lower substrate 444b. The substrates 444a, 444b have respective curved surfaces 448a, 448b, shown in FIG. 4B as opposing convex surfaces. A fusion sample (not shown) can be pre-positioned in a focal region 460 located, for example, midway along a length of the shock propagation layer 442, as also shown. In-plane shock waves 446a, 446b can be propagated towards the focal region 460 using, for example, the multi-shock techniques described above in the context of FIGS. 2A and 3A. It should be understood that, with the geometry of FIG. 4B, shock waves 446a, 446b may not be strictly planar but are described herein as "in-plane" or "planar" for convenience. Due to the orientation of the curved substrate surfaces 448a, 448b, the thickness of the shock propagation layer 442 can decrease as the shock focal region 460 is approached. In this way, the propagating in-plane shock waves 446a, 446b can be more and more confined in the through-plane dimension while approaching the shock focal region 460. The shock propagation layer 442 and/or substrate layers 444a, 444b can be provided from any of the materials described above in conjunction with FIG. 4A. Other geometries could also be used to reduce the propagation layer thickness. For example, the two substrates could have two opposing conical surfaces. Alternatively, for example, one flat substrate and one substrate with a convex or conical surface could be used.

In some embodiments, through-plane shock waves can be generated from above and below the focal region to increase the overall shock pressure using structures and techniques similar to those described above for FIG. 4A.

Figure 5:
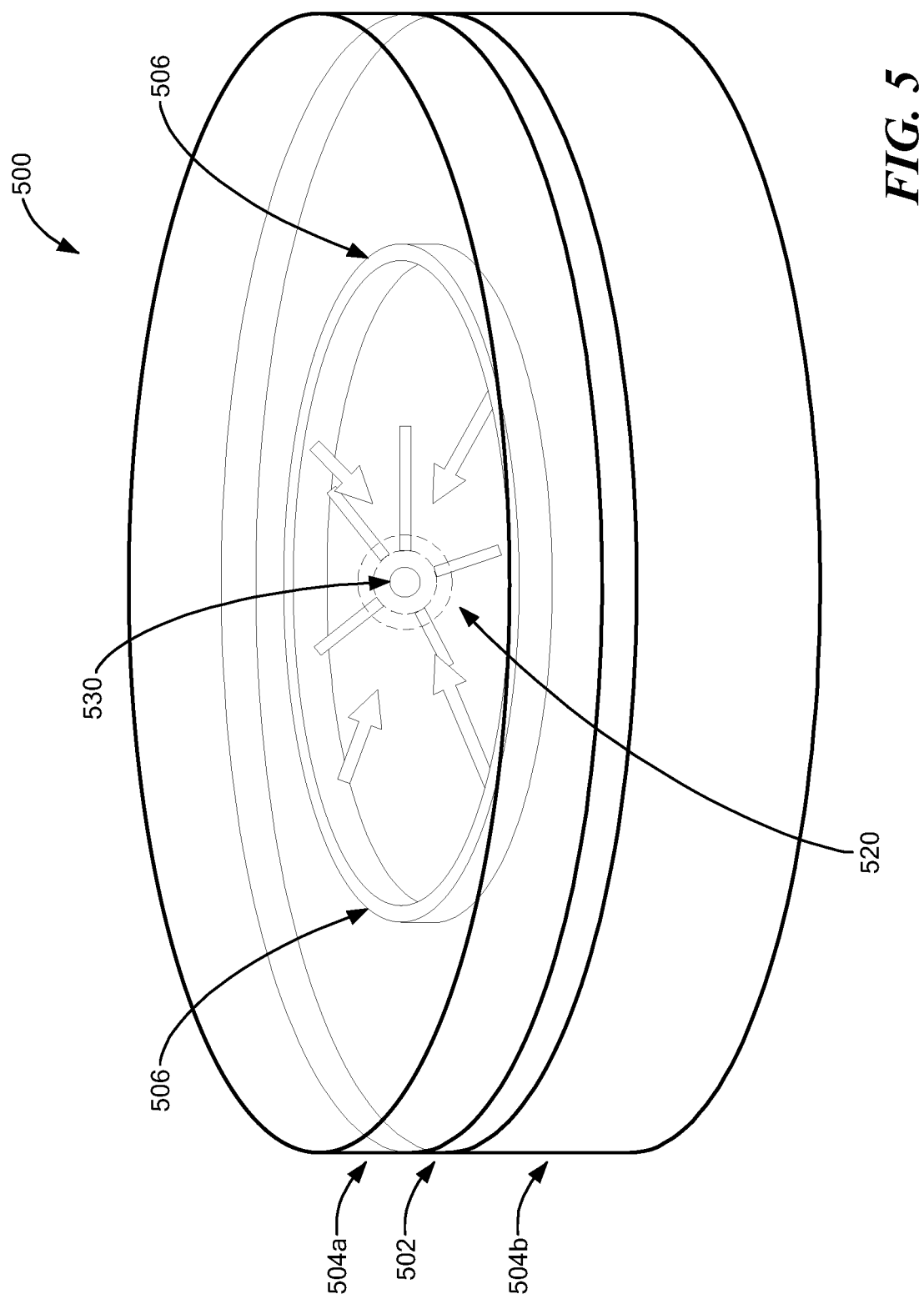
FIG. 5 is a perspective view of a target assembly that can be used within the system of FIG. 1, according to some embodiments of the present disclosure.

Turning to FIG. 5, many different target assembly configurations may be used with the multi-shock systems and techniques disclosed herein. For the shock-induced fusion process, fusion samples made of a mixture of Deuterium and Tritium may produce high net energy gain during the fusion process. Fusion samples of this type can take various forms including but not limited to: (1) liquid thin film in the approximately 1-50 micrometers thickness range of Deuterium-Tritium; and (2) solid thin film in the approximately 1-50 micrometers thickness range Deuterium-Tritium. (3) liquid thin film in the approximately 1-50 micrometers thickness range of heavy water with a Deuterium-Tritium bubble trapped at the center of the laser rings; (4) frozen thin film in the approximately 1-50 micrometers thickness range of heavy water with a Deuterium-Tritium bubble trapped at the center of the laser rings. Here, "thin film" refers to a film having a thickness in the range of several tens of micrometers or less (e.g., less than 90, 80, 70, 60, 50, 40, 30, or 20 micrometers.) In any of these example, Deuterium-Tritium can be replaced with Deuterium-only constituents.

In some embodiments, the shock propagation layer may contain materials that absorb the excitation laser light in order to deposit the laser pulse energy into the layer where it can launch a shock wave. The light-absorbing material could be the liquid, polymer or other material of which the layer is primarily composed, or it could be added to the primary layer constituent. Added constituents could be, for example, carbon nanoparticles or other small nanoparticles, or dye compounds or other absorbing chemical species, which upon absorption of intense laser light may be heated such that the and nearby material are vaporized, generating pressure to launch the shock wave. The absorptive materials can include semiconductor particles, dyes, or other constituents that undergo absorption spectral shifts under pressure such that their absorption of the laser light is increased when they are under shock pressure, thereby ensuring maximum light absorption at the shock location where the pressure is maximum.

FIG. 5 shows an illustrative target assembly 500 that can be used, for example, within the system of FIG. 1, according to some embodiments. The target assembly 500 includes a shock propagation layer 502 disposed between an upper substrate 504a and a lower substrate 504b. The shock propagation layer 502 and/or substrate layers 504a, 504b can be provided from any of the materials described above, or other materials, in conjunction with FIG. 4A. An excitation laser ring 506 (or many concentric rings, or many parallel lines or multiple arrays of parallel lines) can be generated to propagate shock waves towards a focal region 520 using, for example, the planar multi-shock technique described above in the context of FIG. 2A. A fusion sample 530 can be placed within the focal region 520 for fusion ignition. In some embodiments, fusion sample 530 may be a Deuterium-Tritium bubble or droplet trapped, for example, in a resonant acoustic field. In general, fusion sample 530 can comprise any material that can induce nuclear fusion in the gas, liquid or solid state.

Considering the extreme temperature and pressure conditions needed for thermonuclear fusion, the sample 530 may be irreversibly damaged after each laser shot. The energy released during the fusion process can be collected via the emission of high-energy neutrons and other high-energy particles or photons escaping from the fusion core at the center of the laser rings. The diameter of the excitation laser ring 506 (or any one of multiple concentric rings) that launch the shocks may be on the order of hundreds or tens of micrometers in diameter, and could extend to sizes in the millimeter range. The damaged sample area may be of the same order in size. To produce large amounts of fusion energy, in some embodiments rastering of the sample can be performed in between laser shots. For example, after each laser shot, the sample 530 can be moved to a non-damaged area within the shock propagation layer 502 and thermonuclear fusion can be initiated again to produce high-energy neutrons from the non-damaged area. In other embodiments, many smaller samples (e.g., samples having millimeter or centimeter in-plane dimensions) can be fabricated, and a new sample can be used for each laser shot.

Figure 6:
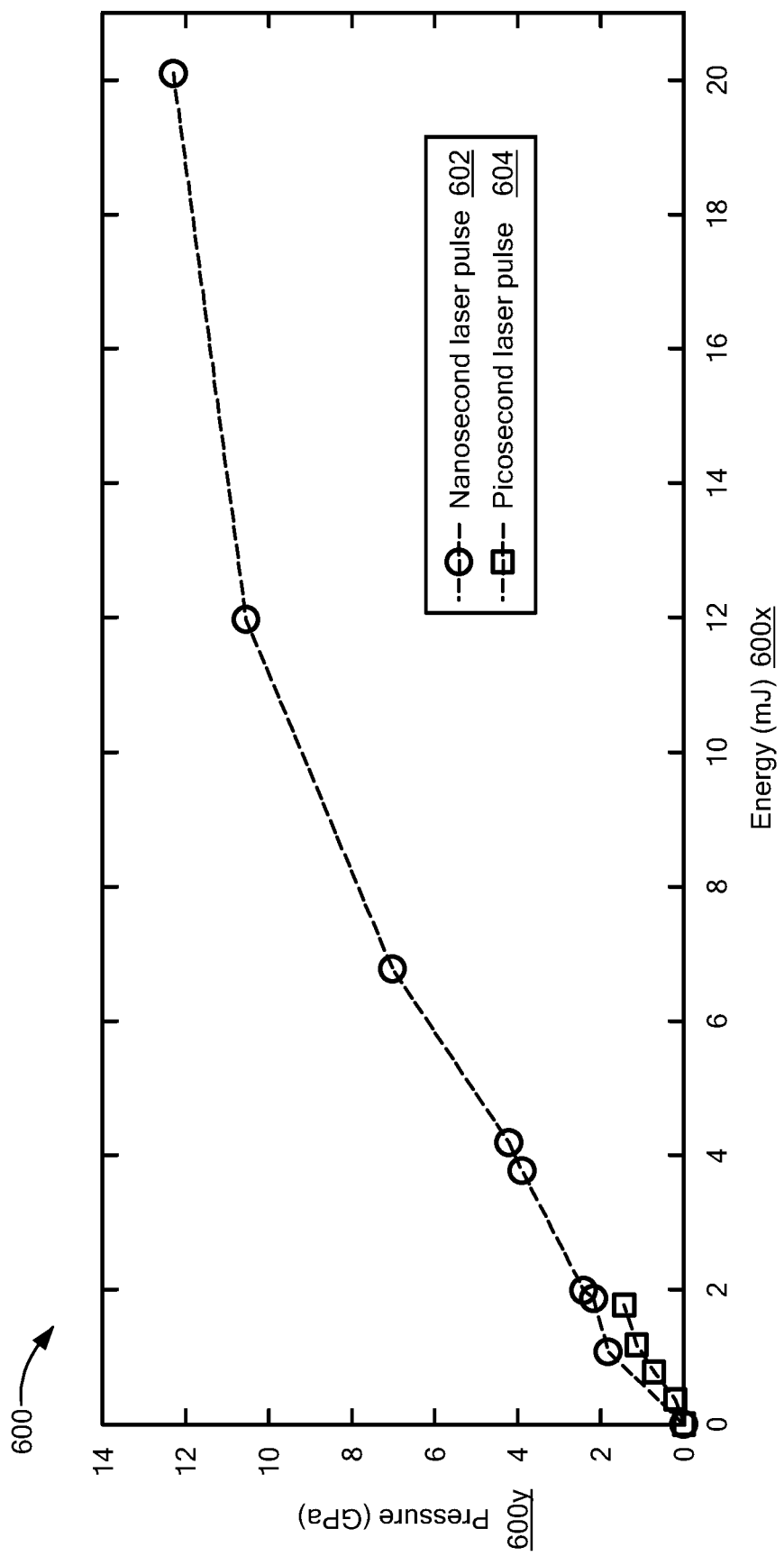
FIG. 6 is a plot showing experimentally measured shock pressures in a shock propagation layer versus excitation laser pulse energy.

Turning to FIG. 6, one advantage of the structures and techniques disclosed herein is that the laser energy is split into many laser beams. Each of these laser beams may be absorbed strongly in the region of the shock propagation layer that it irradiates, thereby contributing effectively to the velocity-matched shock wave to produce extremely high peak pressure and temperature. This approach circumvents the low efficiency of shock generation that may occur due to reduced absorption of the laser energy. This low efficiency is one of the main limitations in current laser-based shock fusion ignition efforts, where the formation of plasma during the first part of the irradiating laser pulse results in high reflectivity for the rest of the irradiating laser pulse, drastically reducing the efficiency of shock excitation. In current laser-based inertial confinement fusion experiments, most of the energy is reflected by the plasma and only a small portion of the laser energy couples to the excitation of shock waves. The present disclosure allows most of the excitation laser pulse energy to be absorbed and opens the way to orders of magnitude higher efficiency for shock excitation.

An illustrative plot 600 illustrates measured shock pressures 600y at a focal region versus excitation laser pulse energy 600x. The measured shock pressures 600y correspond to shock pressures measured at 15 nanoseconds time delay after shock excitation in a water shock propagation layer sandwiched between two glass substrates. The excitation laser pulse energy 600x corresponds to excitation laser pulse energy from a nanosecond or picosecond duration laser pulse focused to a 100-micron diameter ring at the focal region. As shown, plateauing of the shock pressure can occur when high laser pulse energies are used to excite a sample positioned within the focal region. The efficiency of the laser shock excitation from a single laser pulse may not scale linearly with laser pulse energy because absorption of the laser light may saturate at increasing energies, resulting in a plateau in the amount of laser pulse energy that contributes to shock generation. The technique disclosed herein circumvents this problem. The data labeled 602 were obtained using a nanosecond duration excitation laser pulse, and the data labeled 604 were obtained using a picosecond duration excitation laser pulse.

Figure 7:
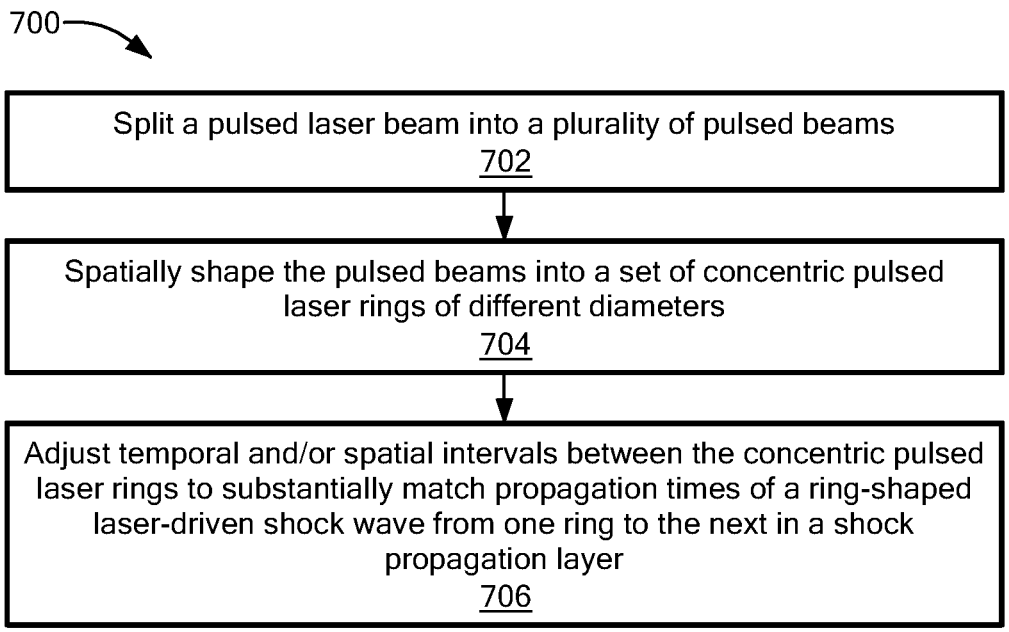
FIGS. 7 and 8 are flow diagrams showing methods for synchronous excitation of multiple shock waves in a target assembly, according to some embodiments of the present disclosure.

FIG. 7 is a flow diagram showing a method 700 for synchronous excitation of multiple shock waves in a target assembly, according to some embodiments of the present disclosure. At block 702, a pulsed laser beam can be split into a plurality of pulsed laser beams. The pulsed laser beam can be generated by one or more laser sources such as a laser source described above in the context of FIG. 1. At block 704, the plurality of pulsed laser beams can be spatially shaped into a plurality of concentric pulsed laser rings of different diameters. Techniques for such spatial shaping are described above in the context of FIGS. 1 and 2A. At block 706, temporal and/or spatial intervals (e.g., ring diameters) between the concentric pulsed laser rings can be adjusted to substantially match propagation times of a ring-shaped laser-driven shock wave from one ring to the next in a shock propagation layer of the target assembly. Techniques for controlling such temporal or spatial intervals are described above in the context of FIGS. 1 and 2A. The ring-shaped laser-driven shock waves can propagate substantially within the plane of the shock propagation layer and converge toward a focal region where, for example, a fusion sample is positioned. In some embodiments, the method 700 can further include, coincident with the convergence of the in-plane ring-shaped shock waves at the focal region, directing through-plane shock waves at the focal region or directing through-plane laser light that is directly absorbed by the fusion sample.

Figure 8:
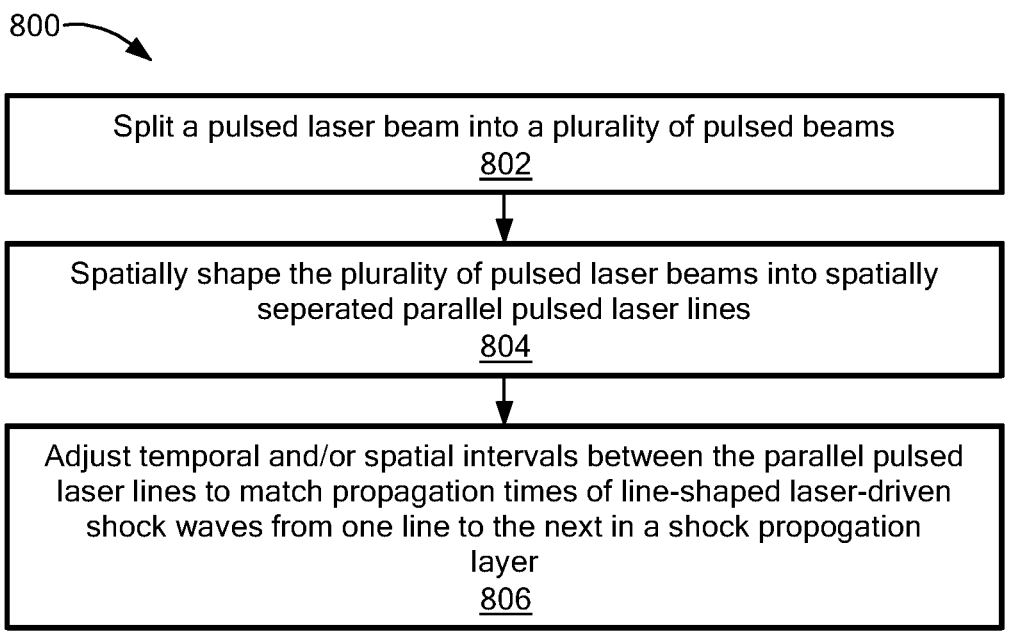

FIG. 8 is a flow diagram showing another method 800 for synchronous excitation of multiple shock waves in a target assembly, according to some embodiments of the present disclosure. At block 802, a pulsed laser beam can be split into a plurality of pulsed laser beams. The pulsed laser beam can be generated by one or more laser sources, such as a laser source described above in the context of FIG. 1. At block 804, the plurality of pulsed laser beams can be spatially shaped into spatially separated parallel pulsed laser lines. Techniques for such spatial shaping are described above in the context of FIGS. 1 and 3A. At block 806, temporal and/or spatial intervals between the parallel pulsed laser lines can be adjusted to match the propagation times of a line-shaped laser-driven shock wave from one line to the next in a shock propagation layer of the target assembly. Techniques for controlling such time intervals are described above in the context of FIGS. 1 and 3A. In some embodiments, the line-shaped shock waves can propagate substantially within the plane of the shock propagation layer and converge toward a focal region after passing through or reflecting from an acoustically focusing element, as discussed above in the context of FIG. 3A. In some embodiments, the method 800 can further include, coincident with the convergence of the in-plane shock wave at the focal region, directing through-plane shock waves at the focal region. In some embodiments, the method 800 can include multiple arrays of pulsed laser lines to generate multiple in-plane shock waves that propagate in different directions in the sample plane such that the shock waves intersect at a region of the shock propagation layer at which the shock pressure is increased.

One application of present disclosure is thermonuclear fusion for the production of energy. Other applications include the production of high pressures and high temperatures for the characterization or synthesis of materials under extreme conditions which can be attractive for many research and development entities. In some such applications a laser source providing as little as 10 millijoules energy might be sufficient. In some embodiments this may benefit from multiple shocks rather than one large shock, and this can be achieved by adjusting the spatial and/or temporal separation of rings or lines appropriately as described earlier. Disclosed embodiments can be practiced using relatively low-cost, readily available lasers (e.g., Nd:YAG lasers) and do not require the use of a gas gun or dangerous explosives that are sometimes used to reach high pressures. In some embodiments, the structures and techniques disclosed herein can be implemented within small-scale devices that can be operated close to a customer's site of use (district, building, house, ship etc.). As such, the present disclosure may circumvent the problems of losses or impracticality in electric power transportation from the power plant or power generation site to the customers.

Figure 9:
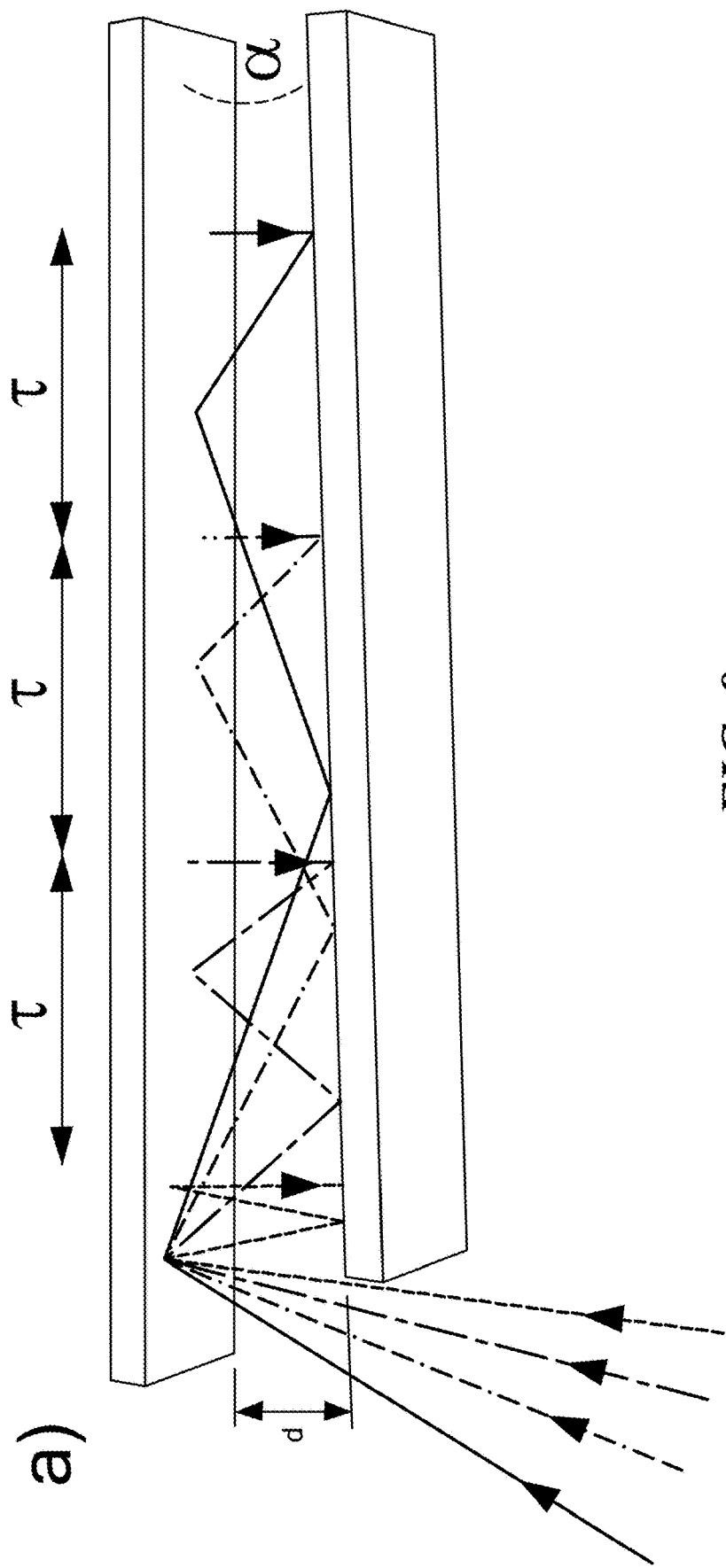
FIG. 9(a) shows a tilted optical cavity produces different optical delays for a single converging input beam with different incoming angles.
FIG. 9(b) shows each of these sub-beams can be focused on the sample surface at different times t, that can be modified by tuning the cavity spacing d, and at different locations controlled with the tilt angle α. A scan of delay time τ can be performed to track the shock build-up—i.e., the synchronous laser excitation of multiple shock waves.
Figure 9:
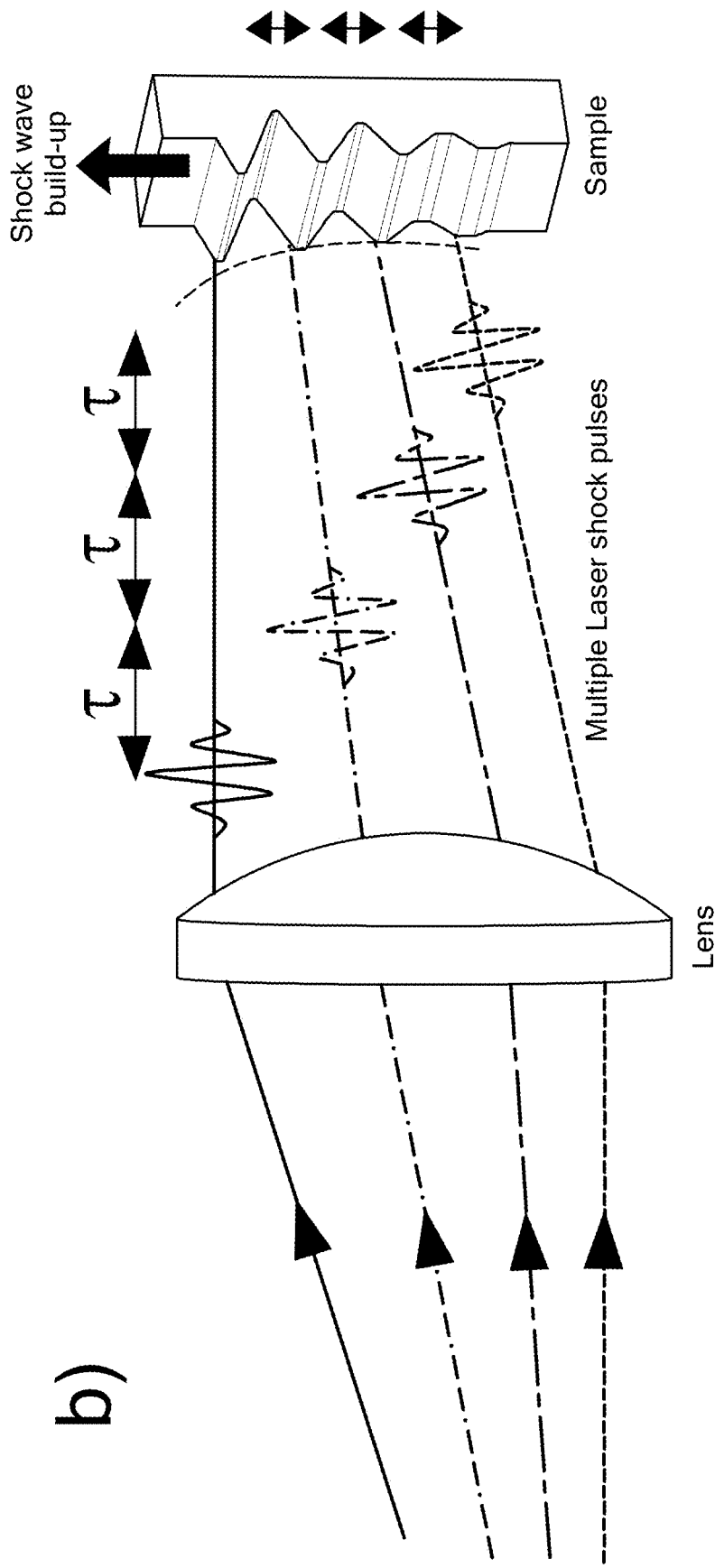

The concept of a multi-beam laser shock excitation technique can be applied utilizing the optical cavity design detailed in FIGS. 9(a) and 9(b) (collectively "FIG. 9"). While this method could be used to probe any materials system, here this technique is applied to investigate the behavior of synchronous build-up of multi-shock waves during propagation along the surface of selected mechanophore compounds as well as in nano-alloys.

FIG. 9(a) shows a tilted optical cavity producing different optical delays for a single converging input beam with different incoming angles. FIG. 9(b) shows how each of these sub-beams can be focused on the sample surface at different times t, that can be modified by tuning the cavity spacing d, and at different locations controlled with the tilt angle α, so that a scan of delay time τ can be performed to track the shock build-up—i.e., the synchronous laser excitation of multiple shock waves.

The optical cavity of FIG. 9 can output multiple laser beams that have controlled spatiotemporal spread, which can be fine-tuned to match the shock propagation on the sample surface, to maximize and add to the laser excitation of the shock front. Motivated by the advantages that mechanophores provide, being materials that undergo chemical and optical changes in response to mechanical impulses, focus is given on the development of a new methodology to activate and characterize mechanophore transformations at a solid interface under shock loading conditions. Specifically, the intent here is to discern and differentiate the molecular attributes that are critical to the mechanophore transformations during shock loading, where shock-induced stress and strain-rates would be coupled.

These experimental results help build an understanding of the ultrafast physical processes involved during shock loading of mechanophore or metallic nano-alloys samples, in conjunction with providing a tool to study the fundamental aspects of a new process for laser-shock excitation based on synchronous acoustic energy build-up.

Figure 10:
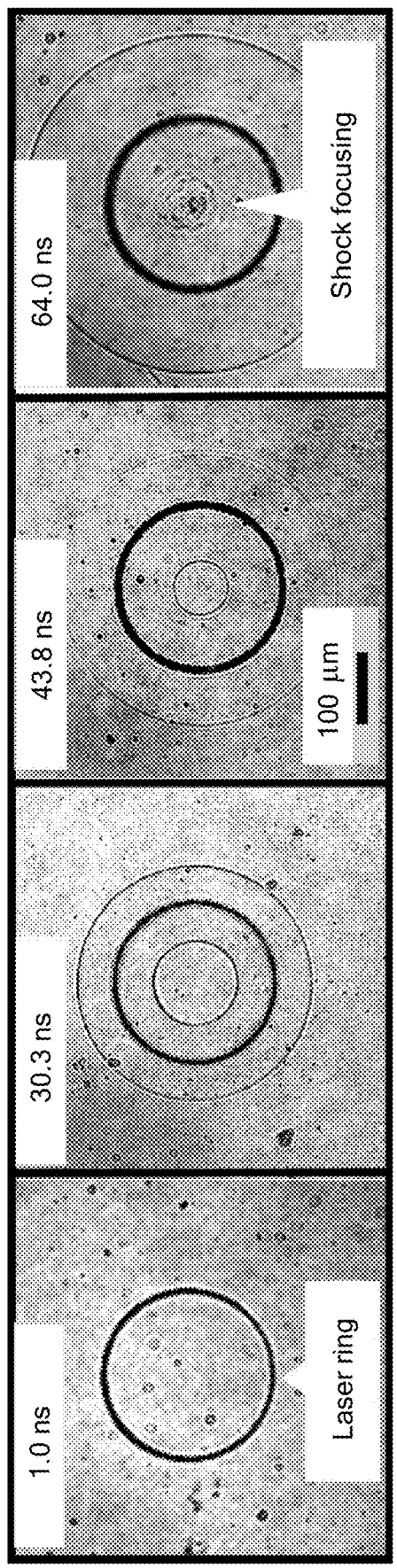
FIG. 10 shows snapshot images taken at different times during the shock propagation along the surface of a water sample. The laser, shaped as a ring, excites two annular shock waves. The shock wave that travels toward the center of the ring, acoustically focuses at the center where the shock pressure is the greatest.

In laser shock experiments, the shock wave is generated from the absorption of laser energy in a planar photoacoustic transducer, launching an out-of-plane shock wave to the surrounding sample of interest and is typically detected optically along the normal of the sample surface. An alternate approach based on 2D acoustic focusing of shock waves generated by a laser may be used, see FIG. 10. FIG. 10 shows snapshot images taken at different times during the shock propagation along the surface of a water sample, in which the laser, shaped as a ring, excites two annular shock waves, and in which the shock wave that travels toward the center of the ring acoustically focuses at the center where the shock pressure is the greatest. In this case, the shock wave propagates laterally in-plane within the sample. This approach provides ample accessibility for optical spectroscopy and diagnostics enabling the direct visualization of shock waves in solid or liquid samples.

Beyond the 2D focusing laser shock geometry, alternative possibilities may be used to drive multiple additive shock waves in a variety of materials, without the drawbacks of laser sample damage. In fact, one point of the multi-shock technique is that it will enable the laser excitation and superposition of tens of weak shock waves. Each of these laser excited weak shock waves will carry a moderate pressure range, well below sample damage from the absorption of laser energy, and under appropriate acoustic phase matching conditions, will spatiotemporally overlap with the many other laser excited weak shock waves-linear acoustic waves. The advantage of this technique is that it will enable the excitation of high pressure shock waves from many linear acoustic waves. From the fundamental point of view, this innovative technique will shed light on the aspects of laser excitation of multiple overlapping ultrasonic waves, to form a single highly nonlinear shock wave via superposition. This new technique will enable the fundamental investigation of shock formation from linear processes and will give an opportunity to reveal the transition between linear and nonlinear mechanics in many materials. This is unique in the frame of shock research which is always based on irreversible nonlinear processes for shock excitation.

Another aspect of linear shock excitation is that, contrary to direct mechanisms of laser excitation of shock waves that are based on irreversible processes (plasma formation, ablation, cavitation, etc.), the mechanisms for laser excitation of linear ultrasonics are very well established for a plethora of sample types. Therefore, from the technical point of view, the estimation of the overall shock pressure obtained from this new technique may be highly reliable and probably more straightforward than in traditional shock physics.

Since there is no restriction concerning the type of samples that could be investigated with the multi-shock technique, for example several kinds of materials, ranging from stiff solids (metallic alloys) to soft solids (polymers, gels) or even liquids may be used. One motivation is to provide insight into the mechanical behavior of materials under the extreme conditions of very high strain rates. Applications include ballistic threat protection, micrometeorite impacts on spacecraft, high-speed particle impact erosion (such as in jet engine turbine blades), and infrastructure protection against shock waves following explosions.

Figure 11:
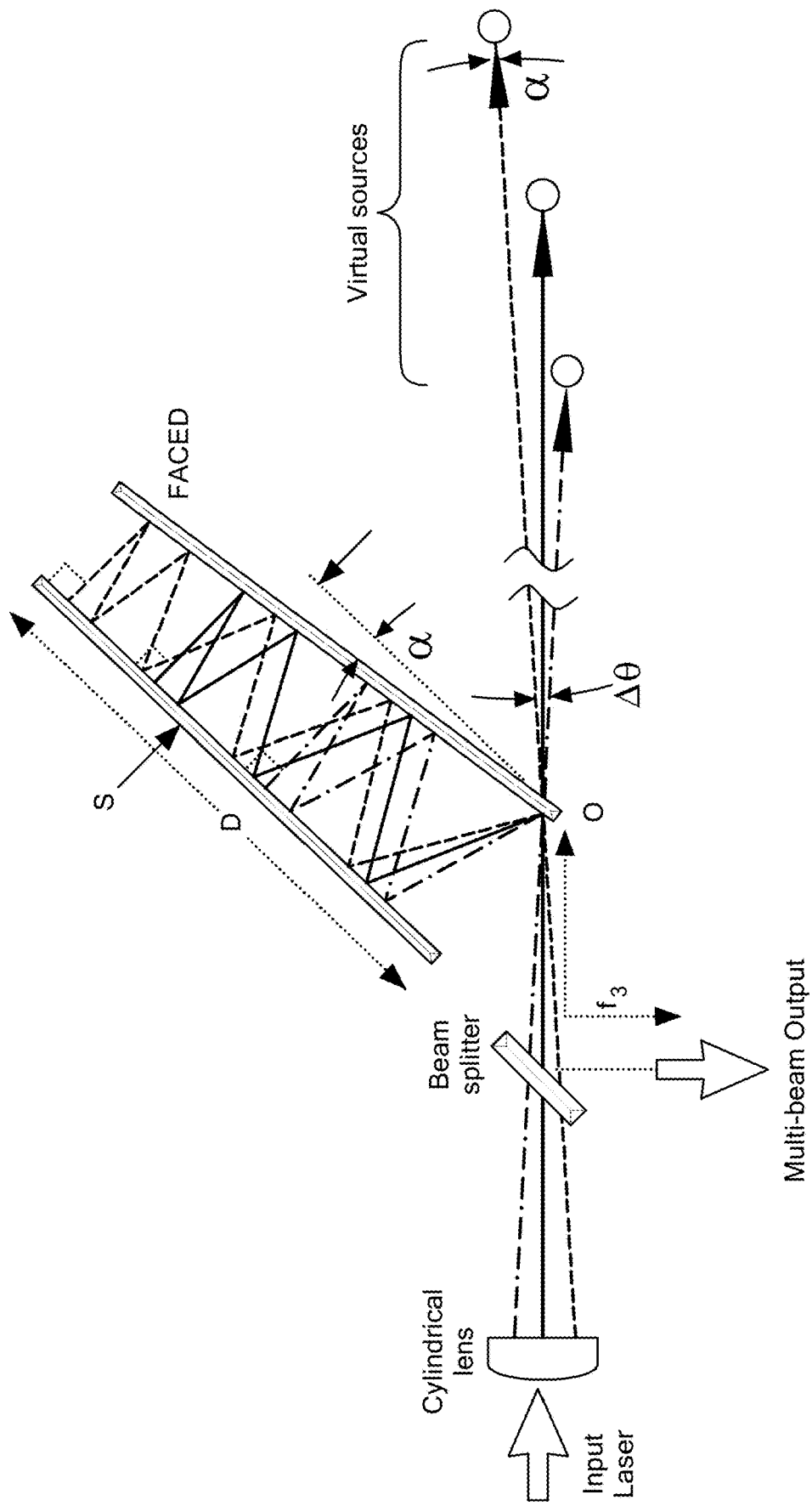
FIG. 11 shows a schematic of a FACED cavity according to an embodiment. Each portion of the input laser beam forms a specific virtual source that experiences a different time delay inside the tilted cavity that is related to its optical zigzag path inside the two plane mirrors. The output beam is formed from the overlap of all these virtual sources of different time delays. A single microscope objective is used to focus the multiple sources on different locations on the sample surface.

The multi-shock technique is inspired from the FACED (Free-space Angular-Chirp-Enhanced Delay) device that has been designed in the context of fluorescence imaging. It uses an optical cavity composed of two slightly tilted mirrors illuminated with a converging laser beam. Each portion of the laser beam experiences different delays inside the cavity, as seen in the schemes of FIG. 9 and FIG. 11. Each portion of the input laser beam forms a specific virtual source that experiences a different time delay inside the tilted cavity that is related to its optical zigzag path inside the two plane mirrors. The output beam is formed from the overlap of all these virtual sources of different time delays. A single microscope objective is used to focus the multiple sources on different locations on the sample surface. The main advantage of the FACED device for our purpose is that without requiring sophisticated optics, it enables fine tuning of the time delay and or the spacing between the individual sources to match the characteristic timescale of the shock propagation in the sample.

Figure 12:
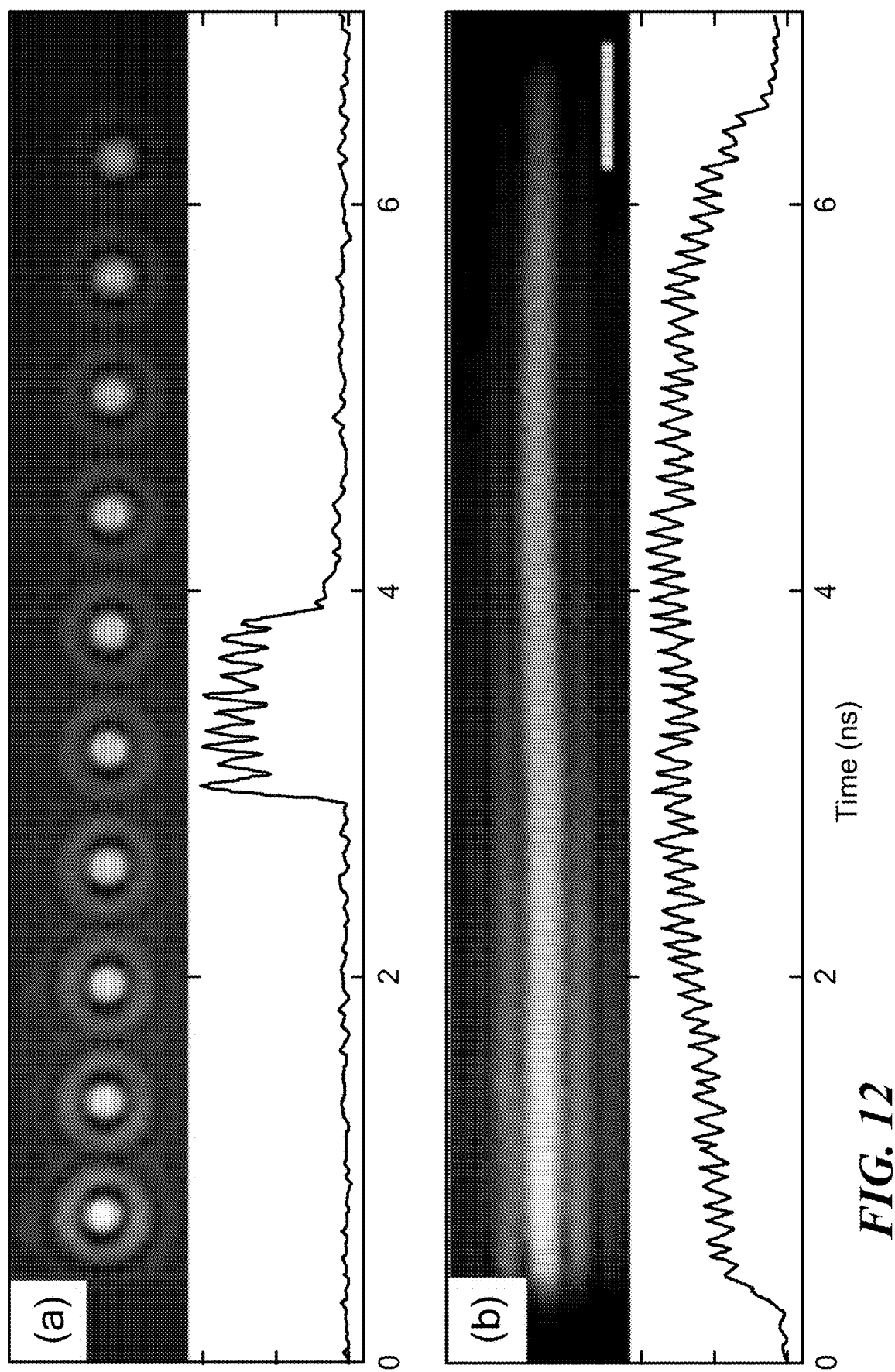
FIGS. 12(a) and 12(b) show images and corresponding time traces of the multiple laser source arrays focused on the sample surface for different tilt angles. The tilt angle governs the total number of sources as well as their spacing. The scale bar indicated is 5 μm.

FIG. 12 shows images and corresponding time traces of the multiple laser source arrays focused on the sample surface for different tilt angles (a) and (b). The scale bar indicated is 5 µm. As shown on FIG. 12, the tilt angle governs the spatial separation between each source and the time delay is simply linked to the light time of flight between the two main mirrors. In practice, the FACED device is commonly used to focus close to one hundred sources with a spatial separation of about 1 micron and a time difference between sources of about 0.2 ns. In the scope of reaching acoustic phase matching, the spatiotemporal separation should match the speed of sound of the material. For many materials, the speed of sound ranges from 1 µm/ns to 5 µm/ns, which is perfectly in line with the spatiotemporal distribution of the output of the FACED device. Therefore, as illustrated on FIG. 12, fine tuning the tilt angle of the cavity can be used to closely reach the acoustic phase matching where all the acoustic sources will be in phase and are expected to result in the build-up of a single intense shock wave.

One can record time-resolved data and images of the acoustic propagation in the studied materials at many different tilt angles and optimize the acoustic phase matching conditions. The data are collected from a probe beam focused on the sample surface in order to measure the change in light intensity concomitant with the propagation of the overall acoustic field corresponding to the superposition of the multiple acoustic sources. This pump-probe optical scheme is similar to the transient grating (TG) experiment that we have used extensively, and that has become a wide spread technique covering a wide range of applications and scientific needs.

Figure 13A:
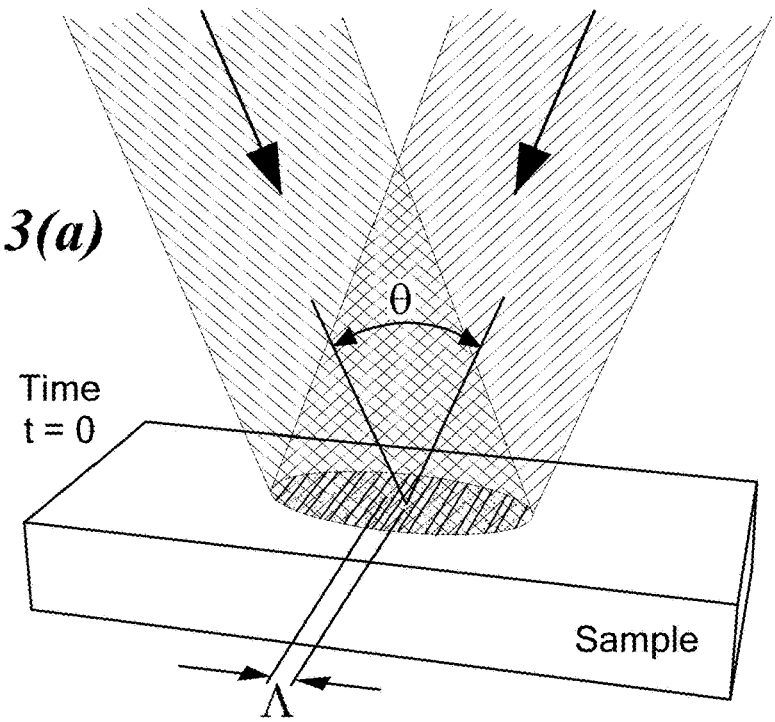
FIG. 13(a) shows the optical transient grating is formed on the sample surface from the overlap of two crossed pump beams.
Figure 13B:
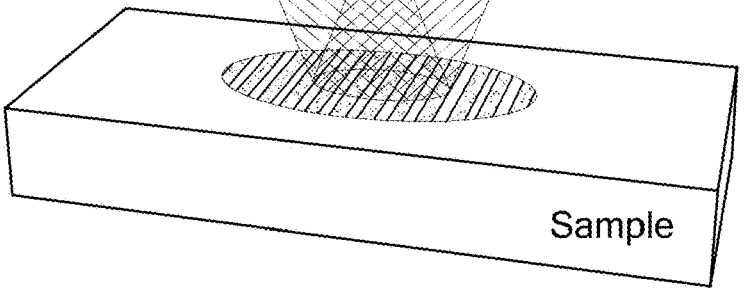
FIG. 13(b) shows a probe beam is used to read out the acoustic wave that matches the transient grating pattern. The diffracted portion of the probe beam is directed to a photodetector coupled to a fast oscilloscope.
Figure 13C:
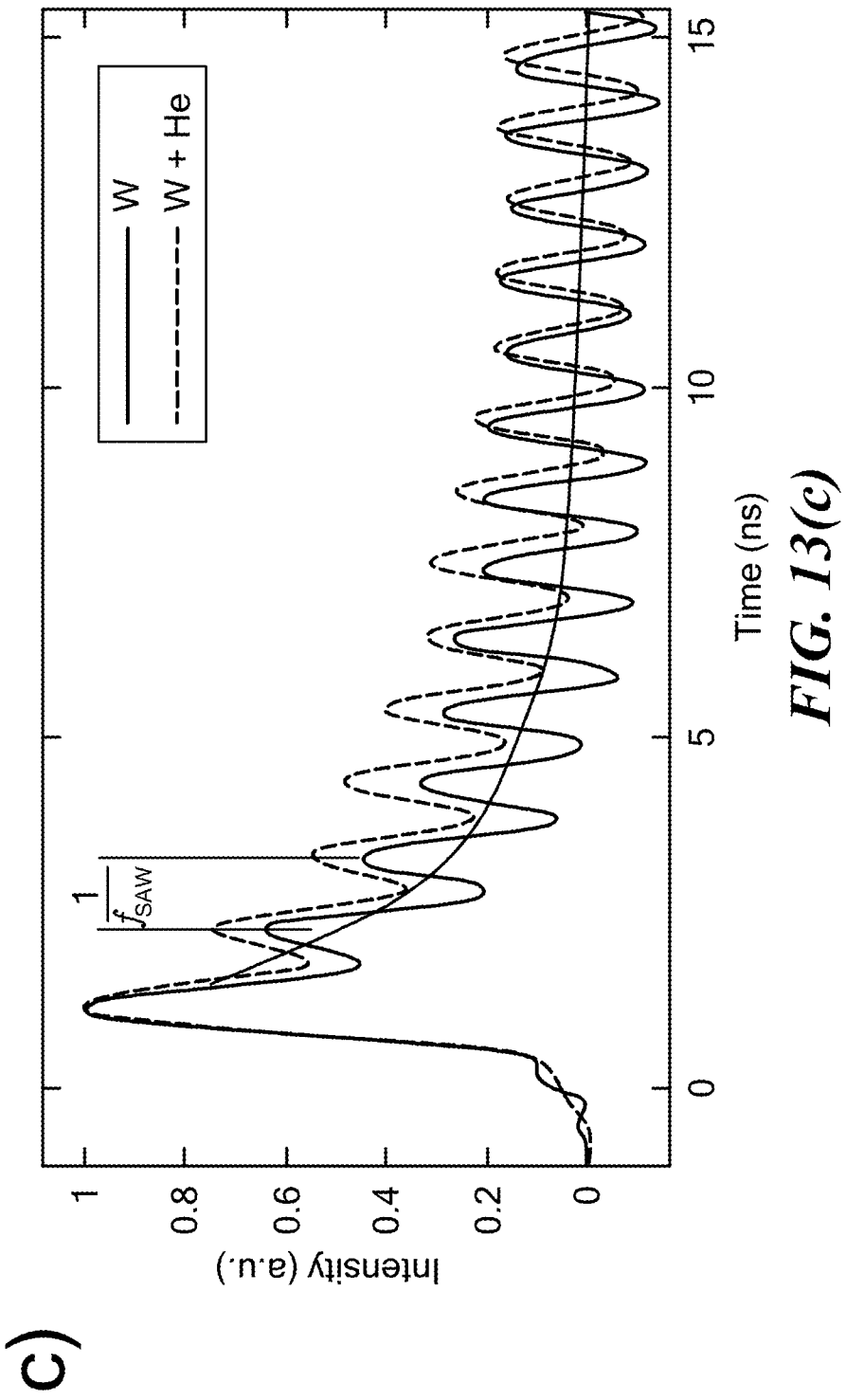
FIG. 13(c) shows a transient grating signal from a tungsten sample and a helium-ion implanted region on the same sample. The nanoseconds oscillations of the signal reveal the frequency of the acoustic wave. From this frequency and the known fringe spacing, we can extract the acoustic velocity.

TG experiments are based on the excitation of acoustic waves from the optical interference of two optically crossed pump beams on a sample surface. The intensity pattern of the optical fringes on the sample surface governs the acoustic wavelength excited, see FIGS. 13(a) and 13(b). A probe beam records the time evolution of the light intensity change due to the propagation of the acoustic wave along the sample surface, see FIG. 13(c). In the TG scheme, since the two crossed pump beams coincide in time on the sample surface, all the fringes are excited coherently at the same time. It may be impractical, if not impossible, to time delay the excitation of the first fringe from the last fringe.

The TG is not appropriate for the investigation of the acoustic phase matching process, unlike the multi-shock setup according to embodiments. The multi-shock setup, due to its simpler optical scheme as compared to TG experiments, could become a widely used experimental scheme. In addition, the overlap of the two pump beams in the TG experiments require customized optical gratings that are costly and wavelength specific. The multi-shock setup requires only two large planer mirrors that are comparably cheap and achromatic for a wide range of optical wavelengths. These mirrors also offer the possibility to continuously vary the spacing between the laser sources. All of these advantages will be highly beneficial for the linear-nonlinear shock study in materials in the framework of this project.

To go further beyond our traditional 2D single ring shock focusing technique, the multi-shock technique can be adapted to laser excite acoustic phase-matched multiple shock rings. Technically, the multiple laser sources of the FACED setup can be converted into multiple rings of different diameters by use of a customized phase mask with a well-defined diffraction pattern designed to optically transform a line source into a ring source at the focus of a lens. This simple optical scheme, that only requires a phase mask, implements our standard 2D laser shock focusing technique. One can expect to significantly increase the overall shock pressure at the center of the multiple laser ring sources. Applications include the production of high shock pressures for the inventory of materials with the highest shock mitigation.

Figure 14:
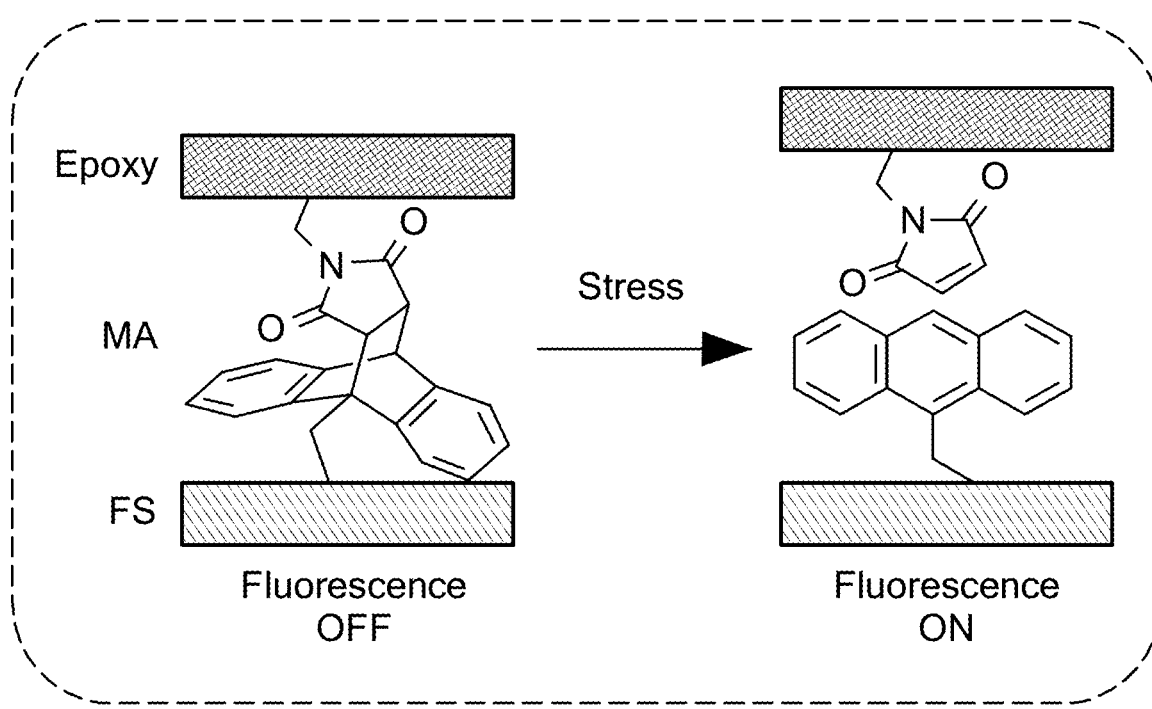
FIG. 14 shows schematic representations of the mechanical activation of covalently anchored maleimide-anthracene (MA) mechanophores. A stress can bond or debond the mechanophore and drastically influence the fluorescence behavior of the compound.

Among the samples that could be studied using the multi-shock methodology, mechanophores may be good candidates. These compounds are highly sensitive to external pressures that result in a significant modification of their structure and physical characteristics (fluorescence/color change, catalyst transformation, electrical conductivity etc.). FIG. 14 shows schematic representations of the mechanical activation of covalently anchored maleimide-anthracene (MA) mechanophores. A stress can bond or debond the mechanophore and drastically influence the fluorescence behavior of the compound.

However, the underlying mechanisms of many mechanochemical processes remain poorly understood due to lack of reliable techniques to investigate the fundamental aspects of these pressure-mediated phase transitions. Systematic investigations of mechanophore activation at solid interfaces can be performed under the shock conditions provided by our new technique, as described on FIG. 13. Specifically, one can discern and differentiate the molecular attributes that are critical to the mechanophore transformations during shock loading, where shock-induced stress and strain-rates would be coupled. The results help to understand the fundamentals of fast molecular processes that underpin the mechanics of debonding and other interfacial phenomena, and provide a tool to study the buildup mechanism and ultimate pressures reached in laser induced shock waves.

FIG. 15(a) shows conceptually an application of a disclosed embodiment. Once the acoustic phase matching conditions are fulfilled, a unidirectional shock wave builds up from the laser excitation of many laser ultrasonics line sources. The multi-shock experiment can be tested in a mechanophore material. Before the shock treatment, the mechanophore is not fluorescent. FIG. 15(b) shows that at a certain pressure threshold, the mechanophore compound becomes fluorescent.

Figure 15:
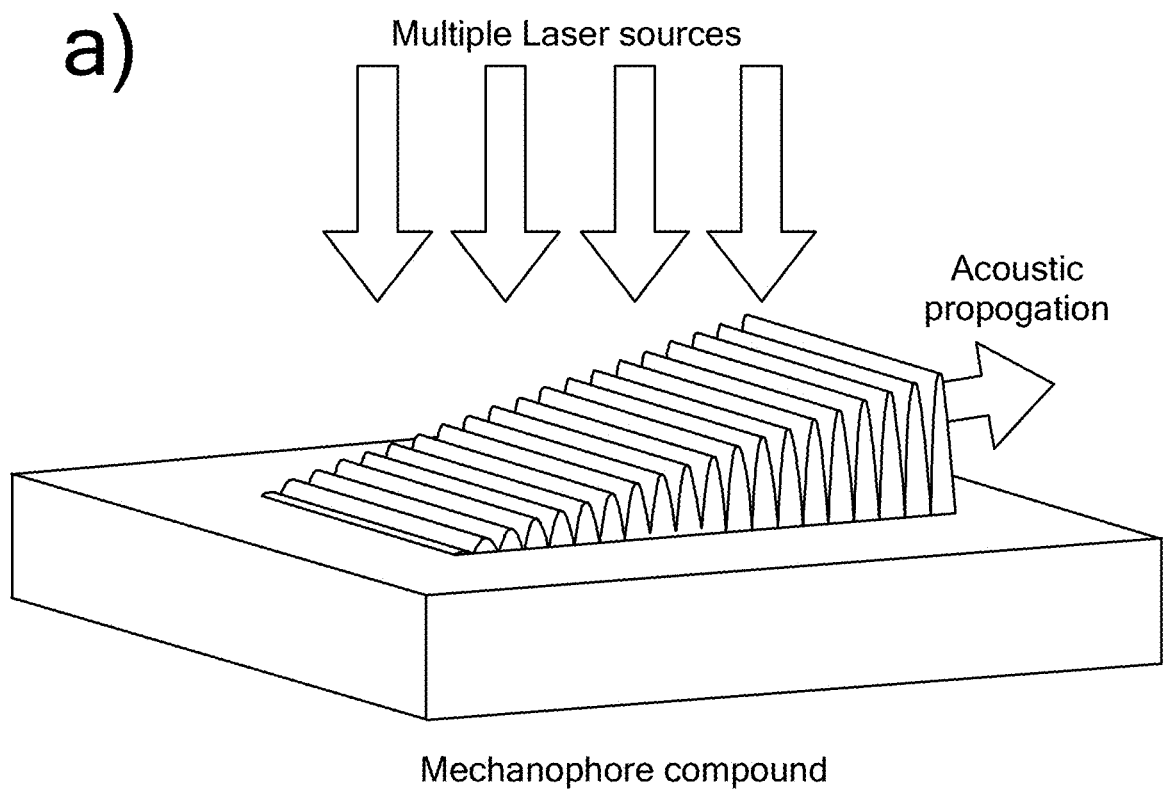
FIG. 15(a) shows conceptually an application of a disclosed embodiment. Once the acoustic phase matching conditions are fulfilled, a unidirectional shock wave builds up from the laser excitation of many laser ultrasonics line sources. The multi-shock experiment was tested in a mechanophore material. Before the shock treatment, the mechanophore is not fluorescent.
FIG. 15(b) shows that at a certain pressure threshold, the mechanophore compound becomes fluorescent.
Figure 15:
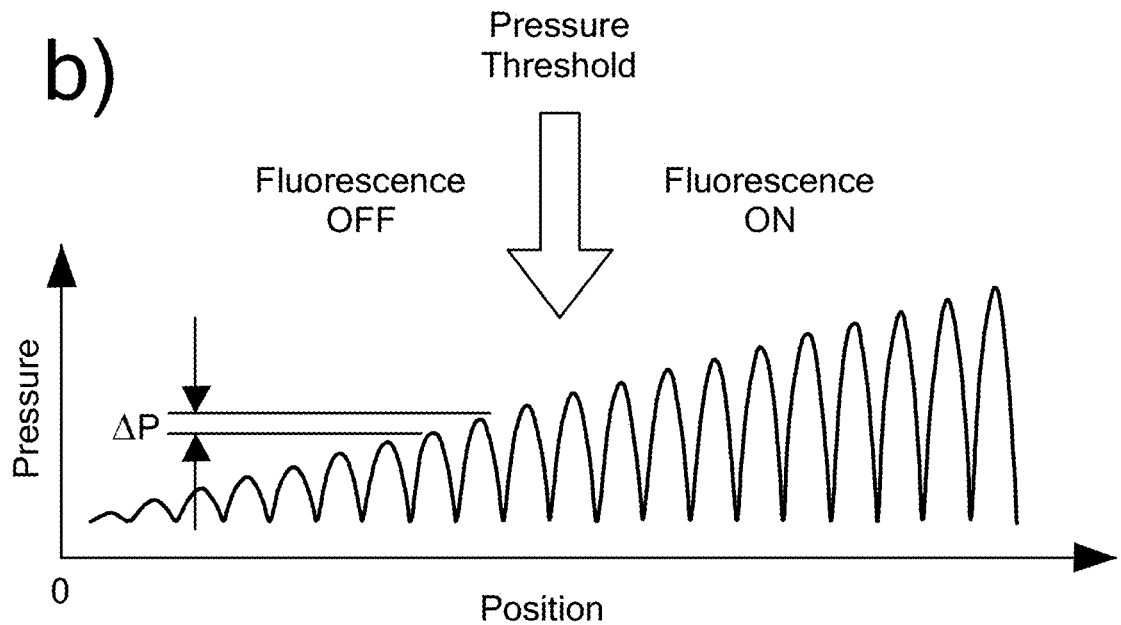

As sketched in FIGS. 15(a) and 15(b) (collectively "FIG. 15"), experiments are based on the excitation of multiple ultrasonics waves on the surface of mechanophore compounds. The mechanophore compound can be coated on a metallic thin film in order to efficiently laser excite the acoustic waves. One can perform post-shocked fluorescence analyses to quantify the pressure threshold for the fluorescence activation. Since distinct positions along the sample surface correspond to different pressures, due to a well-defined step-like pressure increment between each laser source, we can calibrate the shock pressure at each location to obtain information on the pressure threshold needed for fluorescence activation. In order to understand the characteristic time for fluorescence activation through transient pressures, time-resolved experiments can be performed as well. One can use a multi-frame camera which is fast enough to capture on a single shot a sequence of frames with a nanosecond resolution, to take fluorescence images of the sample surface while the multi-shocks propagate across the mechanophore compound. These experiments, that are in line with technical competence in the art, can uncover information about the timescale of the mechanophore process.

Once the bases of the mechanophore parameters, such as pressure threshold and characteristic timescale, are fully characterized for a selected compound, one could use mechanophores as visual pressure sensors for many of traditional shock experiments where the determination of the shock pressure is often elusive. For instance, one may apply our 2D shock focusing technique described in connection with FIG. 10 to determine the shock pressure right at the shock focus for many different laser energies. Data, obtained from mechanophores samples in the context of 2D shock focusing, may benefit the understanding of the shock focusing mechanisms that are of critical importance for future improvement of measurements of the shock pressure.

Alloys are mixtures of different metallic materials that have extremely different properties (mechanical, thermal etc.) as compared to each of its individual constituents. Alloys can be tailored and synthesized from bulk nanocrystalline metals to optimize a specific property such as its hardness, stiffness, melting temperature and wear resistance. The unusually high mechanical strength of these solid solutions of nanocrystalline metals comes mostly from the presence of a large fraction of grain boundaries. Many recent molecular dynamic simulations indicate that nano-alloys have unprecedented ultrahigh strength that could be extremely advantageous for shock mitigation. However, the understanding of the link between the alloy nano-morphology with its physical parameters is scarce. We can apply the multi-shock technique to get understanding on the intricacy between nano-alloys structural characteristics and shock mitigation.

The basics of the experimental investigation of nano-alloys rely on the multi-shock technique and real-time or post-mortem characterization of the shock mitigation. Similarly to the investigation of mechanophore samples, one can shock nano-alloys with our novel shock technique and track the irrevocable structural changes produced by the shock waves, at the microscale (visual sample damage on a microscope, after or during shock loading) and up to the nanoscale (grain dislocations on transmission electron microscope images). It is anticipated that owing to the multi-step shock excitation, it will be straightforward and simple to visually inspect the damage produced on the sample at different pressures thresholds.

Figure 16:
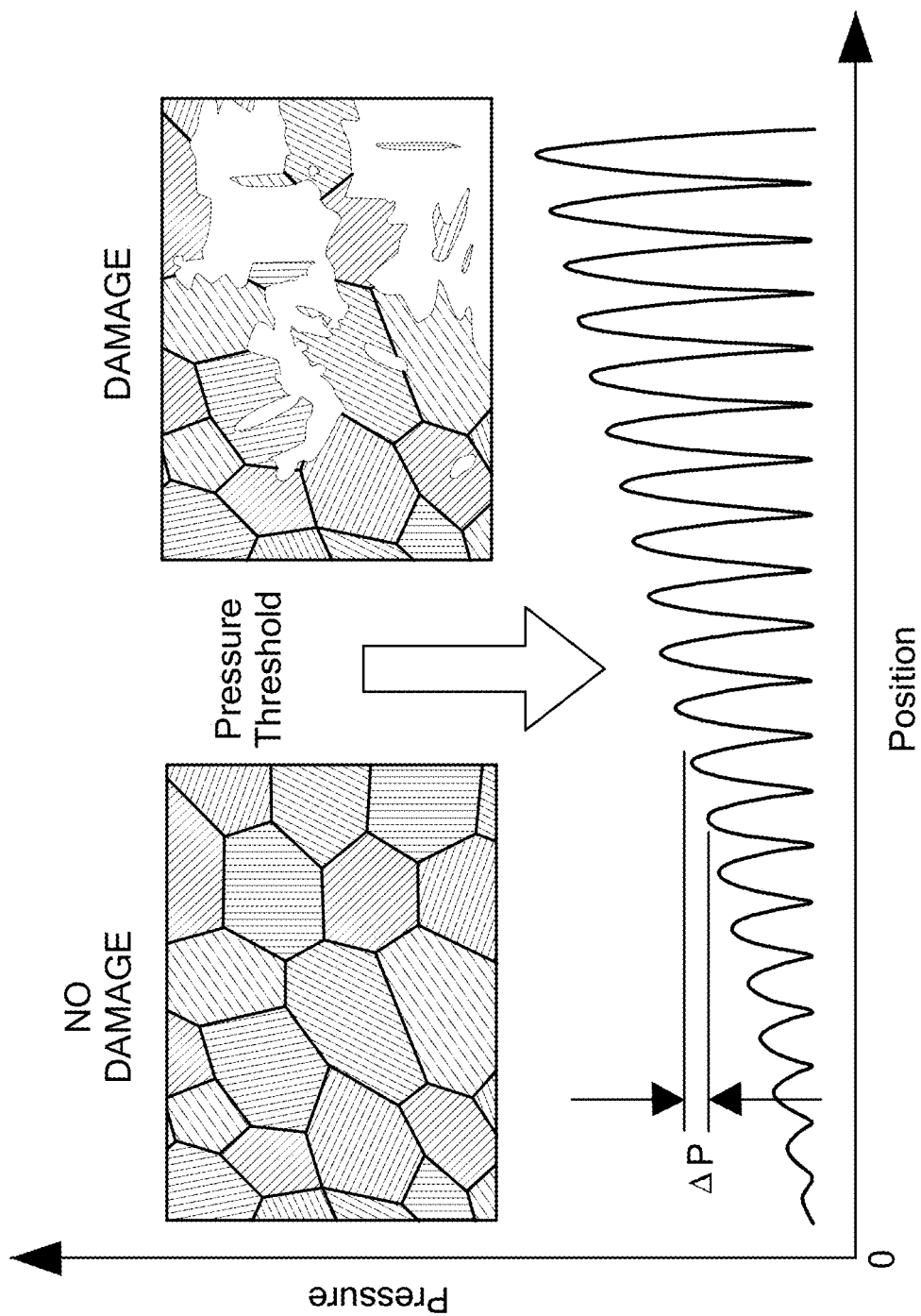
FIG. 16 shows a schematic of the shock mitigation in nano-alloys. The multi-shock setup can be used to quantify the shock pressure threshold that entails sample damage.

FIG. 16 shows a schematic of the shock mitigation in nano-alloys. The multi-shock setup can be used to quantify the shock pressure threshold that entails sample damage. As sketched in this Figure, since each acoustic source position along the sample surface corresponds to an incremental shock pressure, the overall shock pressure can be quantitatively determined at each position on the sample surface. From this simple experimental procedure, one will be able to disentangle the link between shock mitigation and sample damage at incremental shock pressures.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent or similar constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter. It is also understood that the present disclosure does not describe in full detail all of the effects of the laser-driven shock which, in addition to achieving high peak shock pressure, may result in high temperature, compressional collapse of material in the shock propagation layer, and other effects. The spatial and temporal separations between laser rings or lines, and other parameters of the laser excitation process, may be adjusted to optimize any of the induced effects as well as the peak shock pressure. Of note, the target assembly can be sealed to confine any of these induced effects for optimization of the fusion process.

The invention claimed is:

1. A method to excite a shock wave in a shock propagation layer of a target assembly, the method comprising:
    generating a pulsed laser beam;
    splitting the pulsed laser beam into a plurality of pulsed laser beams;
    shaping the plurality of pulsed laser beams into a plurality of concentric pulsed laser rings of different diameters; and
    applying the plurality of concentric pulsed laser rings to the shock propagation layer, to thereby produce a plurality of optically excited concentric shock waves in the shock propagation layer in a focal region;
    wherein shaping the plurality of pulsed laser beams includes adjusting temporal and/or spatial intervals between successive rings of the concentric pulsed laser rings to match propagation times of corresponding successive concentric shock waves in the shock propagation layer of the target assembly.

2. The method of claim 1, wherein spatially shaping the plurality of pulsed laser beams into a plurality of concentric pulsed laser rings comprises spatially shaping the plurality of pulsed laser beams using one or more optical phase masks.

3. The method of claim 1, wherein adjusting the temporal and/or spatial intervals comprises at least one of:
    using a free-space angular-chirp-enhanced delay (FACED) device;
    using one or more deformable mirrors or spatial light modulators;

inserting one or more elements of specified thickness and refractive index into a path of one or more of the plurality of concentric pulsed laser rings; or controlling relative timings and amplitudes of two or more of the converging shock waves.

4. The method of claim 3, wherein the FACED device comprises an axisymmetric FACED cavity.

5. The method of claim 1, further comprising:

coincident or near-coincident with convergence of a concentric shock wave at the focal region, directing one or more pulsed laser beams substantially perpendicular plane of the shock propagation layer at the focal region.

6. The method of claim 1, wherein the shock propagation layer is disposed between a first substrate and a second substrate.

7. The method of claim 1, wherein the shock propagation layer comprises a liquid or a polymer material that absorbs laser light for effective shock generation.

8. The method of claim 1, wherein the shock propagation layer includes a constituent whose absorption spectrum shifts under pressure such that its absorption of the laser light is stronger while the shock is present.

9. The method of claim 1, wherein a spacing or a time delay between successive rings of the concentric pulsed laser rings is not constant.

10. The method of claim 1, wherein the shock propagation layer comprises laser light absorptive materials that are heated when laser light is absorbed such that nearby material are vaporized, generating pressure to create the plurality of shock waves.

11. A method of exciting a shock wave in a target assembly, the target assembly comprising a shock propagation layer and a focal region defined within the shock propagation layer, the method comprising:

generating a pulsed laser beam;

splitting the pulsed laser beam into a plurality of pulsed laser beams;

shaping the plurality of pulsed laser beams into a plurality of concentric pulsed laser rings of different diameters; and applying the plurality of concentric pulsed laser rings to the shock propagation layer to optically excite a plurality of shock waves converging at the focal region, wherein intervals between successive laser rings applied to the shock propagation layer match propagation times of the optically excited shock waves in the shock propagation layer.

\* \* \* \* \*